United States Patent
Forutanpour et al.

(10) Patent No.: US 9,310,217 B2
(45) Date of Patent: Apr. 12, 2016

(54) METHODS AND SYSTEMS FOR MANAGING CONTENT DELIVERY

(75) Inventors: Babak Forutanpour, Carlsbad, CA (US); David L. Bednar, San Diego, CA (US); Devender Akira Yamakawa, San Diego, CA (US); Kevin Edward Hunter, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 13/494,547

(22) Filed: Jun. 12, 2012

(65) Prior Publication Data

US 2013/0332297 A1    Dec. 12, 2013

(51) Int. Cl.
G06Q 30/00 (2012.01)
G01C 21/34 (2006.01)
H04W 36/32 (2009.01)
H04W 64/00 (2009.01)

(52) U.S. Cl.
CPC ........... *G01C 21/3461* (2013.01); *H04W 36/32* (2013.01); *H04W 64/003* (2013.01); *H04W 64/006* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 7,302,465 B2 | 11/2007 | Ayres et al. |
| 7,600,034 B2 | 10/2009 | Nasu et al. |
| 2004/0077362 A1* | 4/2004 | Chinomi ............ H04W 76/002 455/456.5 |
| 2006/0126556 A1 | 6/2006 | Jiang et al. |
| 2007/0054672 A1 | 3/2007 | Onishi et al. |
| 2008/0287141 A1* | 11/2008 | Vogel et al. ................ 455/456.3 |
| 2009/0191892 A1 | 7/2009 | Kelley |
| 2009/0247137 A1 | 10/2009 | Awad |
| 2010/0057563 A1 | 3/2010 | Rauber et al. |
| 2010/0085947 A1 | 4/2010 | Ringland et al. |
| 2011/0257882 A1* | 10/2011 | McBurney et al. ........... 701/208 |
| 2011/0310865 A1* | 12/2011 | Kennedy et al. .............. 370/338 |

FOREIGN PATENT DOCUMENTS

| JP | 2010008302 A | 1/2010 |
| WO | 2009156554 | 12/2009 |

OTHER PUBLICATIONS

International Search Report and Written Opinion—PCT/US2013/043868—ISA/EPO—Aug. 22, 2013.

* cited by examiner

*Primary Examiner* — Ethan D Civan
(74) *Attorney, Agent, or Firm* — Shirin Tefagh

(57) ABSTRACT

Methods and apparatus for delivering content may include receiving a direction of travel for a wireless device and selecting a route of travel for the wireless device that proceeds in the given direction to maximize an amount of contact with one or more access terminals capable of providing data connectivity. In addition, the methods and apparatus may include providing content to the wireless device via the data connectivity provided by the one or more access terminals along the selected route of travel.

74 Claims, 22 Drawing Sheets

900

902

CONTENT I HAVE

☐ Movies | Movie 1 ▼ — 904
          | Movie 2
          | ⋮

☐ Music  | Song 1 ▼
          | Song 2
          | ⋮

☐ Electronic Books | Book 1 ▼
                    | Book 2
                    | ⋮

ALLOW CONTENT UPLOAD?

☐ Always

☒ Contacts

906

☐ Never

FIG. 9

METHODS AND SYSTEMS FOR MANAGING CONTENT DELIVERY

BACKGROUND

With the proliferation of wireless devices that have increased power, memory, and other features, more and more wireless devices are being used for entertainment purposes, including for executing content such as games, movies, and audio. Users of wireless devices may want to access and/or receive content using their wireless devices. However, users may be limited in the amount of content that may be accessed and/or received via their wireless device based upon a network access plan that the user has with a network service provider. Moreover, users may have to pay additional costs for accessing and/or receiving content using their network access plan.

Thus, it would be desirable to obtain content through data connectivity, such as Wireless Fidelity (WiFi) and Bluetooth or other free services, other than through a paid network access plan.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for delivering content. The method may include receiving a destination for a wireless device. The method may also include determining a location of one or more access terminals for providing data connectivity between a current location of the wireless device and the received destination. The method may additionally include selecting one or more routes of travel for the wireless device to the destination based upon the determination. Moreover, the method may include sending a notification message to the one or more access terminals along the selected route of travel to provide content to the wireless device via the data connectivity provided by the one or more access terminals.

Another aspect relates to at least one processor configured for delivering content. The processor may include a first module for receiving a destination for a wireless device. The processor may also include a second module for determining a location of one or more access terminals for providing data connectivity between a current location of the wireless device and the received destination. The processor may further include a third module for selecting one or more routes of travel for the wireless device to the destination based upon the determination. In addition, the processor may include a fourth module for sending a notification message to the one or more access terminals along the selected route of travel to provide content to the wireless device via the data connectivity provided by the one or more access terminals.

Yet another aspect relates to a computer program product. The computer program product may include a computer-readable medium including at least one instruction for causing a computer to receive a destination for a wireless device. The computer-readable medium may also include at least one instruction for causing the computer to determine a location of one or more access terminals for providing data connectivity between a current location of the wireless device and the received destination. The computer-readable medium may further include at least one instruction for causing the computer to select one or more routes of travel for the wireless device to the destination based upon the determination. The computer-readable medium may also include at least one instruction for causing the computer to send a notification message to the one or more access terminals along the selected route of travel to provide content to the wireless device via the data connectivity provided by the one or more access terminals.

Another aspect relates to an apparatus which may include means for receiving a destination for a wireless device. The apparatus may also include means for determining a location of one or more access terminals for providing data connectivity between a current location of the wireless device and the received destination. The apparatus may additionally include means for selecting one or more routes of travel for the wireless device to the destination based upon the determination. Moreover, the apparatus may include means for sending a notification message to the one or more access terminals along the selected route of travel to provide content to the wireless device via the data connectivity provided by the one or more access terminals.

Yet another aspect relates to an apparatus. The apparatus may include a receiving component operable to receive a destination for a wireless device. In addition, the apparatus may include a route manger component operable to determine a location of one or more access terminals for providing data connectivity between a current location of the wireless device and the received destination and select one or more routes of travel for the wireless device to the destination based upon the determination. The apparatus may include a content delivery manager component operable to send a notification message to the one or more access terminals along the selected route of travel to provide content to the wireless device via the data connectivity provided by the one or more access terminals.

Another aspect relates to a method for delivering content. The method may include receiving a direction of travel for a wireless device. The method may also include selecting a route of travel for the wireless device that proceeds in the given direction to maximize an amount of contact with one or more access terminals capable of providing data connectivity. In addition, the method may include providing content to the wireless device via the data connectivity provided by the one or more access terminals along the selected route of travel.

Another aspect relates to at least one processor configured for delivering content. The processor may include a first module for receiving a direction of travel for a wireless device. The processor may also include a second module for selecting a route of travel for the wireless device that proceeds in the given direction to maximize an amount of contact with one or more access terminals capable of providing data connectivity. The processor may further include a third module for providing content to the wireless device via the data connectivity provided by the one or more access terminals along the selected route of travel.

Yet another aspect relates to a computer program product. The computer program product may include a computer-readable medium including at least one instruction for causing a computer to receive a direction of travel for a wireless device. The computer-readable medium may further include at least one instruction for causing the computer to select a route of travel for the wireless device that proceeds in the given direction to maximize an amount of contact with one or more access terminals capable of providing data connectivity. In addition, the computer-readable medium may include at least one instruction for causing the computer to provide content to the wireless device via the data connectivity provided by the one or more access terminals along the selected route of travel.

Another aspect relates to an apparatus. The apparatus may include means for receiving a direction of travel for a wireless device. The apparatus may also include means for selecting a route of travel for the wireless device that proceeds in the given direction to maximize an amount of contact with one or more access terminals capable of providing data connectivity. The apparatus may additionally include means for providing content to the wireless device via the data connectivity provided by the one or more access terminals along the selected route of travel.

Yet another aspect relates to an apparatus for delivering content. The apparatus may include a receiving component operable to receive a direction of travel for a wireless device. The apparatus may further include a route manager component operable to select a route of travel for the wireless device that proceeds in the given direction to maximize an amount of contact with one or more access terminals capable of providing data connectivity. In addition, the apparatus may include a content delivery manager component operable to provide content to the wireless device via the data connectivity provided by the one or more access terminals along the selected route of travel.

Another aspect relates to for delivering content. The method may include receiving, at an access terminal, a request to transmit content to a wireless device. The method may further include transmitting the content via a data connectivity provided by the access terminal.

Another aspect relates to at least one processor configured for delivering content. The processor may include a first module for receiving, at an access terminal, a request to transmit content to a wireless device. The processor may also include a second module for transmitting the content via a data connectivity provided by the access terminal.

Yet another aspect relates to a computer program product. The computer program product may include a computer-readable medium including at least one instruction for causing a computer to receive, at an access terminal, a request to transmit content to a wireless device. The computer-readable medium may also include at least one instruction for causing the computer to transmit the content via a data connectivity provided by the access terminal.

Another aspect relates to an apparatus. The apparatus may include means for receiving, at an access terminal, a request to transmit content to a wireless device. The apparatus may further include means for transmitting the content via a data connectivity provided by the access terminal.

Yet another aspect relates to an apparatus for delivering content. The apparatus may include a content delivery component operable to receive a request to transmit content to a wireless device and transmit the content via a data connectivity provided by the access terminal.

Still another aspect relates to a method for receiving content. The method may include selecting a destination to travel towards. The method may also include receiving a selected route of travel to the destination based upon a location of one or more access terminals that provide data connectivity between a current location and the selected destination. The method may further include navigating the selected route of travel to the destination. The method may also include receiving content via the data connectivity provided by the one or more access terminals while navigating the selected route of travel.

Another aspect relates to at least one processor configured for receiving content. The processor may include a first module for selecting a destination to travel towards. The processor may also include a second module for receiving a selected route of travel to the destination based upon a location of one or more access terminals that provide data connectivity between a current location and the selected destination. In addition, the processor may include a third module for navigating the selected route of travel to the destination. The processor may further include a fourth module for receiving content via the data connectivity provided by the one or more access terminals while navigating the selected route of travel.

Yet another aspect relates to a computer program product. The computer program product may include a computer-readable medium including at least one instruction for causing a computer to select a destination to travel towards. The computer-readable medium may also include at least one instruction for causing the computer to receive a selected route of travel to the destination based upon a location of one or more access terminals that provide data connectivity between a current location and the selected destination. The computer-readable medium may additionally include at least one instruction for causing the computer to navigate the selected route of travel to the destination. The computer-readable medium may also include at least one instruction for causing the computer to receive content via the data connectivity provided by the one or more access terminals while navigating the selected route of travel.

Another aspect relates to an apparatus. The apparatus may include means for selecting a destination to travel towards. The apparatus may also include means for receiving a selected route of travel to the destination based upon a location of one or more access terminals that provide data connectivity between a current location and the selected destination. In addition, the apparatus may include means for navigating the selected route of travel to the destination. The apparatus may also include means for receiving content via the data connectivity provided by the one or more access terminals while navigating the selected route of travel.

Still another aspect relates to an apparatus. The apparatus may include a navigation component operable to select a destination to travel towards, receive a selected route of travel to the destination based upon a location of one or more access terminals that provide data connectivity between a current location and the selected destination, and navigate the selected route of travel to the destination. The apparatus may also include a presenting component operable to receive content via the data connectivity provided by the one or more access terminals while navigating the selected route of travel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 8-16 illustrate example interfaces in accordance with another aspect;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for delivering content to one or more wireless devices via access terminals, such as kiosks and/or other devices that are capable of providing data connectivity. In particular, the described aspects may use one or more access terminals along a route of travel for the wireless device to provide content and/or a portion of the content to the wireless device. For example, if a user of a wireless device is walking through a city and is streaming music from a content provider onto the wireless device, the described aspects may use the data connectivity provided by access terminals along the route of travel of the user to provide the requested music. Therefore, as the user moves through the city, various access terminals may provide the streaming music to the wireless device instead of the user using a data plan to stream the music.

In addition, the methods and apparatus may receive a destination, such as an address or location where the user of the wireless device is heading, and determine one or more possible routes to the destination based upon a number and/or a coverage area of access terminals that are capable of providing data connectivity to the wireless device along the route of travel. The methods and apparatus may select the route of travel that maximizes an amount of contact with the one or more access terminals, and therefore, maximize the amount of data connectivity along the route of travel. In an aspect, a user may select a route that maximizes contact with access terminals associated with a particular content provider. For example, a map may be presented to the user showing the locations of various access terminals of the content provider and the user may select a route that maximizes the number and/or a coverage area of access terminals associated with the content provider.

As used herein, the term "content" includes, at least, one or more of any type of application, multimedia file, image file, executable, program, web page, script, document, presentation, message, data, meta-data, music, video, electronic book, ringtone, wallpaper, an electronic representation of a physical item, language, typeface, character set, or any other type of media or information that may be rendered, processed, or executed on a device.

Figure 1:
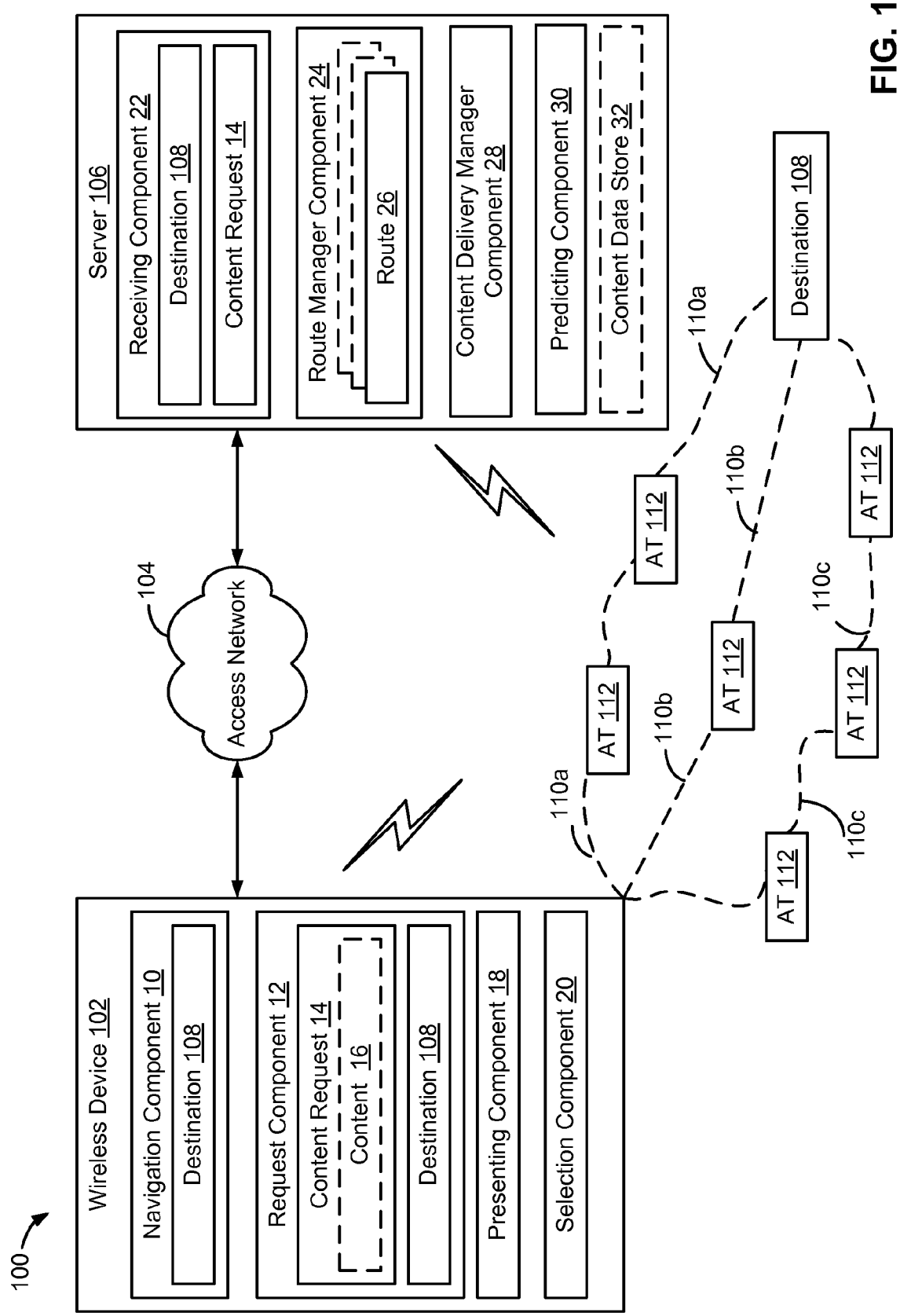
FIG. 1 is an illustration of a connectivity system in accordance with an aspect.

Referring now to FIG. 1, illustrated is an example system 100 for content delivery in accordance with an aspect. System 100 may include one or more wireless devices 102 communicating with one or more servers 106. In addition, system 100 may also include one or more access terminals 112 in communication with wireless device 102 and/or server 106.

In an aspect, server 106 may receive a content request 14 from wireless device 102 to access and/or receive content 16 while traveling towards a destination 108. Server 106 may communicate with one or more access terminals 112 along the route of travel for the wireless device 102 that are capable of providing data connectivity, e.g. via a wireless communication technology such as via Wireless Fidelity (WiFi), WiFi-Direct, Bluetooth, ultrasound, light transmission, or some other local area network technology, to wireless device 102. As such, server 106 may identify one or more access terminals 112 able to provide the requested content 16 to wireless device 102 while wireless device 102 is traveling along the route. In an aspect, server 106 may send the requested content 16 to access terminal 112 and access terminal 112 may provide the received content 16 to wireless device 102 using the data connectivity provided by access terminal 112. In an aspect, access terminal 112 may have the requested content 16 stored locally on access terminal 112. Therefore, server 106 may communicate with one or more access terminals 112 and request that access terminal 112 provide all or some portion of the requested content 16 to wireless device 102.

In an aspect, wireless device 102 may send content request 14 directly to one or more access terminals 112 by using a short range peer-to-peer communication link, such as Bluetooth and/or Wifi-Direct. For example, one or more access terminals 112 (e.g., a kiosk and/or another wireless device) may be within a proximity of wireless device 102 and may be capable of providing content to wireless device 102. Wireless device 102 may have an application that allows wireless device 102 to discover and communicate with the other access terminals 112 within proximity of wireless device 102 that may be capable of providing content to wireless device 102 using, for example, a peer-to-peer communication link, such as Bluetooth, WiFi-Direct, etc.

Wireless device 102 may include any mobile, portable computing or communications device, such as a cellular device, that may connect to an access network 104. Wireless device 102 may be, for example, a cellular telephone, a navigation system, a computing device, a camera, a personal digital assistant (PDA), a music device, a gaming device or a handheld device having wireless connection capability, among other devices. Server/computing device 106 may include any mobile or fixed computing device connected to a network.

In addition, access network 104 may provide one or more types of communication connections, such as any type of wireless airlink, to wireless device 102 and server 106. Wireless device 102 may place and/or receive a call, e.g., a voice call, a data call, a conference call, a video conferencing call, an Internet Protocol session, a Voice Over Internet protocol (IP) call, a short message service (SMS) message, a multimedia messaging service (MMS) message, an instant messaging (IM) service message, a chat or net-meeting related connection, a video, music, or data transfer, among other communications, via access network 104 to and/or from one or more servers 106. In addition, wireless device 102 may receive a call via access network 104 from one or more servers 106, or from any other device in communication with access network 104. Moreover, wireless device 102 may receive a call or otherwise establish a communication connection with one or more access terminals 112, such as via a local area network and/or via a peer-to-peer communication.

Wireless device 102 may include a navigation component 10 operable to receive input for one or more destinations 108 where wireless device 102 may travel. Destinations 108 may include any location where a user of wireless device 102 may want to travel. For example, a user of wireless device 102 may enter a name of a location, such as a restaurant name and/or an address of a location into navigation component 10. In addition, navigation component 10 may have voice recognition components that can recognize the speech of the user and the user may speak the name of the location.

Navigation component 10 may also be operable to determine the direction of travel of wireless device 102, the speed of travel of wireless device 102 and/or the mode of transportation (e.g., walking, driving, etc.) of wireless device 102. In an aspect, navigation component 10 may receive inputs from other components on wireless device 102, such as a compass, an accelerometer and/or global positioning system (GPS) indicating the direction of travel and/or the speed of travel for the wireless device 102. For example, the compass may indicate if the direction of the wireless device was changed more than x degrees (e.g., the wireless device was heading north and now is heading west).

In another aspect, if wireless device 102 is in communication with a vehicle, the navigation component 10 may receive directional information obtained from a Controller Area Network Bus (CANBUS) system on the vehicle. For example, an onboard compass in the vehicle may report to the navigation component 10 when the vehicle turns the steering wheel via, for example, a CANBUS port. In addition, one or both of an onboard gyroscope and accelerometer on the vehicle and in communication with the CANBUS may indicate a direction or change of direction, e.g. whether the vehicle is traveling in a straight path or turning.

Navigation component 10 may further receive inputs regarding the mode of transportation for wireless device 102. Mode of transportation may include, but is not limited to, walking, driving, biking, and flying, among other modes of transportation. For example, navigation component 10 may prompt a user to enter a selection for a mode of transportation, or may deduce a mode of transportation based upon one or more of speed, acceleration, altitude, direction of travel, etc.

Wireless device 102 may also include a request component 12 operable to forward a content request 14 to server 106 to access and/or receive content 16. For example, the content request 14 may include a request for content 16, such as a request for movies, games, music, text, video, audio, applications, web page, an electronic book or any other type of content. The content request 14 may also request a particular type of content 16, such as a request for an electronic book by a particular author and/or a particular movie title. In addition, request component 12 may communicate with navigation component 10 and forward the destination 108 to server 106.

Server 106 may have a receiving component 22 operable to receive content request 14 and/or destination 108 from wireless device 102. Server 106 may additionally include a route manager component 24, in communication with receiving component 22, operable to determine one or more routes 110*a*, 110*b*, and 110*c* to destination 108. In an aspect, route manager component 24 may also select one or more routes 26 for traveling to destination 108 from the plurality of determined routes of travel 110*a*, 110*b*, and 110*c*. For example, route manager component 24 may select route 26 based upon a number and/or a coverage area of access terminals 112 that are along the selected route 26. By selecting a route with the largest number of access terminals, or a route providing the most coverage area by the access terminals, the amount of data connectivity along the route may be maximized.

Server 106 may also include a content delivery manager component 28 operable to manage the delivery of the requested content 16 to wireless device 102. Content delivery manager component 28 may communicate with receiving component 22 to determine the destination 108 where wireless device 102 is travelling and/or what content 16 wireless device 102 is requesting to access and/or receive. Moreover, content delivery manager component 28 may communicate with one or more access terminals 112 along the route of wireless device 102 to arrange delivery of requested content 16.

Figure 2:
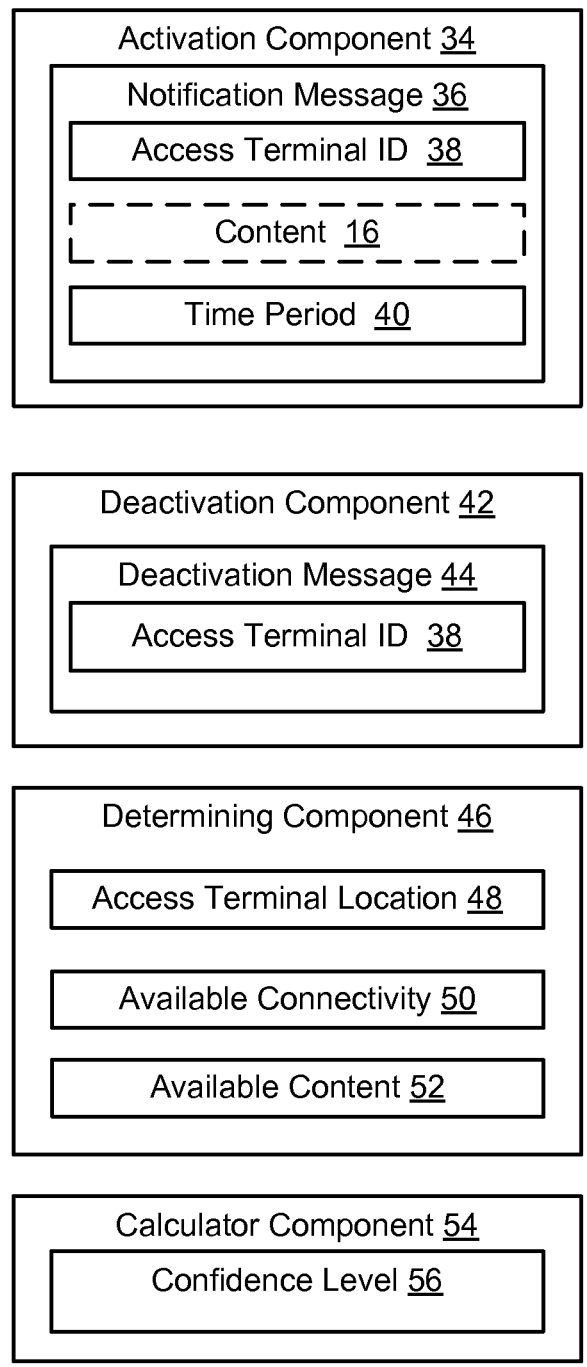
FIG. 2 is an illustration of an example content delivery manager component in accordance with an aspect.

Referring to FIG. 2, for example, content delivery manager component 28 may include an activation component 34 operable to send a notification message 36 to one or more access terminals 112. Notification message 36 may notify and/or activate one or more access terminals 112 to provide the requested content 16 via the data connectivity provided by access terminal 112. For example, when wireless device 102 is approaching an area of coverage of access terminal 112, activation component 34 may send notification message 36 to access terminal 112 to notify access terminal 112 that wireless device 102 is approaching the area of coverage of access terminal 112. Notification message 36 may include an access terminal identifier (ID) 38 that identifies a particular access terminal 112 to be activated by content delivery manager component 28. In addition, in some aspects, notification message 36 and/or a separate subsequent message may include the requested content 16. In an aspect, server 106 may have a content data store 32 (FIG. 1) which includes the requested content 16. Content delivery manager component 28 may interface with the content data store 32 to retrieve the requested content 16 and send the requested content 16 to access terminal 112.

Notification message 36 may further include a time period 40 for when a particular access terminal 112 should be activated and provide the requested data connectivity and/or content 16 to wireless device 102. The time period 40 may be based upon a prediction of when wireless device 102 may be near access terminal 112, e.g. within communication coverage area of access terminal 112. For example, time period 40 may be based upon, but not limited to, the speed of travel of the wireless device 102, weather conditions, traffic conditions, mode of transportation of the wireless device 102 and/or the estimated arrival time of wireless device 102 at access terminal 112.

Content delivery manager component 28 may communicate with predicting component 30 (FIG. 1) to determine the time period 40 for when wireless device 102 may be near, e.g. within communication range of, access terminal 112. For example, predicting component 30 may interface with navigation component 10 (FIG. 1) and predict the direction of travel of wireless device 102 based upon information received from navigation component 10 (e.g., the progress wireless device 102 is making along a route of travel). In addition, predicting component 30 may receive additional information, such as but not limited to, weather conditions, the speed of travel of the wireless device, traffic conditions, and the mode of transportation of the wireless device, to aid in predicting the direction of travel of wireless device 102 and/or the estimated arrival time of wireless device 102 at destination 108 and/or within a communication coverage area of a particular access terminal 112.

In addition, content delivery manager component 28 may include a deactivation component 42 operable to send a deactivation message 44 to one or more access terminals 112 to deactivate the access terminal 112 and/or disconnect the data connectivity provided by access terminal 112. Deactivation message 44 may include the access terminal ID 38 to identify the particular access terminal that is to be deactivated. In an aspect, when access terminal 112 is activated but the wireless device 102 changes directions before access terminal 112 delivers the content 16 to the wireless device 102, content delivery manager component 28 may send deactivation message 44 to access terminal 112 to deactivate access terminal 112 and/or to remove the content 16 from the memory of the access terminal.

In an aspect, content delivery manager component 28 may "wake up" access terminals 112 as wireless device 102 approaches the access terminals 112 and deactivate access terminals 112 as wireless device 102 moves away from the area of coverage of the access terminals 112 changes direction and/or another access terminal starts to provide a different amount of the content to the wireless device 102. The amount of content 16 delivered to and/or stored on each access terminal 112 may be reduced by only sending an amount of content 16 that can be transmitted by the respective access terminal 112 to wireless device 102 for a time period when the wireless device 102 is predicted to be in communication with the respective access terminal 112. For example, content delivery manager component 28 may only send the 45th to 63rd minutes of a movie to access terminal 112 to deliver to wireless device 102 when wireless device 102 is predicted to be in communication with access terminal 112. Content delivery manager component 28 may also send the 60th to 75th minutes of the movie to the next access terminal 112 along the route of travel to deliver to wireless device 102 when wireless device 102 is predicted to be in communication with the next access terminal 112. It should be noted, however, that the amount of content 16 at consecutive access terminals 112 along the travel route may include an overlapping portion of content 16, e.g., to insure uninterrupted delivery, and/or if travel progression of the wireless device changes (e.g., speeds up and/or slows down).

By sending a portion of the content to the access terminals, the amount of storage used by the access terminals may be reduced for the received content. For example, the access terminal will only need to store the portion of the content received from the server, e.g., the 45th to 63rd minutes of the movie, instead of storing the entire movie. Thus, the amount of RAM memory used by the access terminal may be reduced. In addition, security may be increased by only having a portion of the content stored at the access terminal. For example, if an individual access the content stored at an access terminal without authorization or if the access terminal is removed and/or stolen by an individual, the individual may only be able to access the portion of the content that is currently stored on the access terminal (e.g., the 45th to 63rd minutes of the movie) instead of the entire movie and/or content database (e.g., over a 1,000 movies).

Content delivery manager component 28 may further include a determining component 46 operable to determine one or more access terminal locations 48, the amount of available data connectivity 50 along the selected routes 26 of travelling to destination 108 and/or available content 52 of access terminals 112 near wireless device 102. For example, determining component 46 may determine the access terminals locations 48 via position/location components, e.g. a satellite or terrestrial-based positioning system, on the access terminals 112. In another aspect, determining component 46 may determine the access terminals locations 48 via peer-to-peer networks. In an aspect, determining component 46 may interface with activation component 34 to send access terminal 112 a notification message 36 indicating that access terminal 112 should move to a different location to provide the requested content. For example, access terminal 112 may receive a notification message 36 indicating that the access terminal 112 should move towards the south west corner of a café to share the requested content.

In an aspect, determining component 46 may interface with a calculator component 54 that may calculate a confidence level 56 for the determined available content 52. The confidence level 56 may be a function of the speed of travel of the wireless device 102, the mode of transportation of the wireless device 102, the distance the wireless device 102 is from the access terminal location 48, and whether the access terminal 112 is static or moving and/or the direction and velocity of movement, among other factors.

In an aspect, the confidence level 56 may also be a function of information regarding the expected location of access terminals 112. For example, if a particular access terminal 112 is traveling towards a destination entered into a navigation component of the access terminal 112, calculator component 54 may use the expected destination information when determining the confidence level 56 for the determined available content 52. Moreover, calculator component 54 may use the expected route of travel of the access terminal 112 when determining the confidence level 56 for the determined available content 52. It should be noted that, in some aspects, access terminal 112 may be another wireless device, e.g. similar to wireless 102 with similar components, such as navigation component 10.

Referring back to FIG. 1, route manager 24 may also communicate with predicting component 30 and use the information provided by predicting component 30 when determining the one or more routes 26 to destination 108. It should be noted that the selected routes 26 may dynamically change based upon, for example, changes in direction of the wireless device, traffic information, a current speed of the wireless device, weather information, and navigation information from navigation component 10 associated with the wireless device 102.

In an aspect, route manager 24 may also communicate with presenting component 18 on wireless device 102. For example, route manager 24 may send a presentation with the selected routes 26 of travel to destination 108 to be presented to a user wireless device 102. Presenting component 18 may also communicate with navigation component 10 so that the navigation component 10 may navigate wireless device 102 along the selected route 26 of travel to destination 108. In an aspect, if wireless device 102 deviates from the selected route 26, e.g., makes a wrong turn or takes a different route, navigation system 10 may notify a user of wireless device 102 that the selected route has changed. The notification may include, but is not limited to, an alarm, haptic feedback such as a vibration, and a voice message indicating that the route has changed, among other notifications.

Wireless device 102 may also have a selection component 20 operable to select one of the routes 26 presented for traveling to destination 108. For example, presenting component 18 may present multiple routes 26 for traveling to destination 108 and selection component 20 may receive a user input selecting one of the routes 26 for traveling to destination 108. Selection component 20 may communicate the selected route to server 106.

Figure 3:
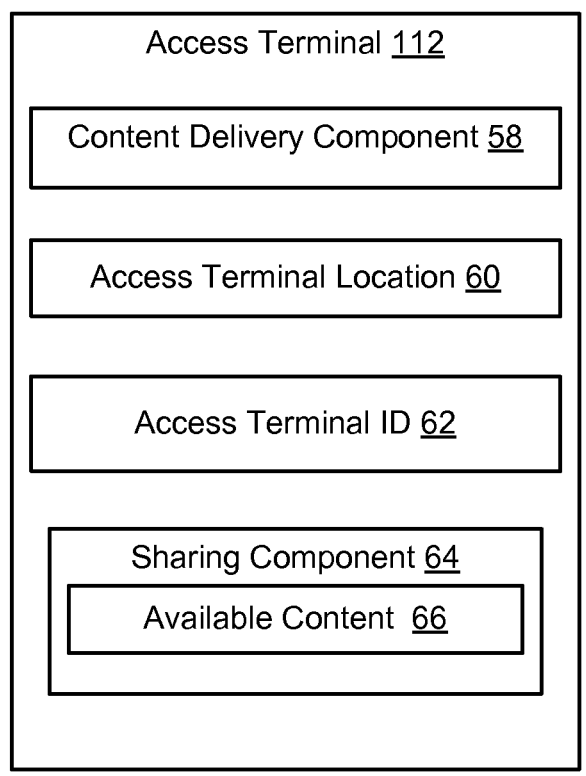
FIG. 3 is an illustration of an example access terminal operable within the connectivity system in accordance with an aspect.

Referring now to FIG. 3, access terminal 112 may include a content delivery component 58 operable to deliver content 16 to wireless device 102 (FIG. 1) via the data connectivity provided by access terminal 112. In an aspect, the content 16 delivered to wireless device 102 may be received from server 106 (FIG. 1). For example, access terminal 112 may receive a notification message 36 (FIG. 2) from server 106 with the content 16 to deliver to wireless device 102 and a time period 40 (FIG. 2) for delivering the content 16 to wireless device 102.

Access terminal 112 may also have a location component 60 (e.g., GPS component) operable to provide the current location of access terminal 112. In addition, access terminal 112 may have an access terminal identification (ID) 62 that identifies the access terminal 112.

Access terminal 112 may further include a sharing component 64 operable to share available content 66 on access terminal 112 with other individuals. For example, the user of access terminal 112 may have available content 66 stored locally at the access terminal 112, including but not limited to content such as games, movies, or songs that the user has purchased and may be willing to share with the user of wireless device 102.

In an aspect, sharing component 64 may have one or more parameters for sharing the available content 66. Parameters for sharing the available content may include, but are not limited to, the degree of contacts to share the content with (e.g., first and second degree contacts); the type of connectivity to use when sharing the content (e.g., WiFi or Bluetooth); a trade requirement (e.g. the other user is required to trade content in exchange for receiving content); a share ratio (e.g., a percentage of content that the other user owns in relation to the amount of content that the other user shares with individuals); a maximum proximity for sharing the content (e.g., within in the same location of the user); and a fee requirement (e.g., receiving a payment in exchange for sharing content); among other parameters for sharing content. Access terminal 112 may implement and/or apply one or more parameters for sharing the available content 66 when determining whether to share available content 66 with a user of wireless device 102. It should be noted that while the above features are described in relation to access terminal 112, that wireless device 102 may also include similar features.

Figure 4:
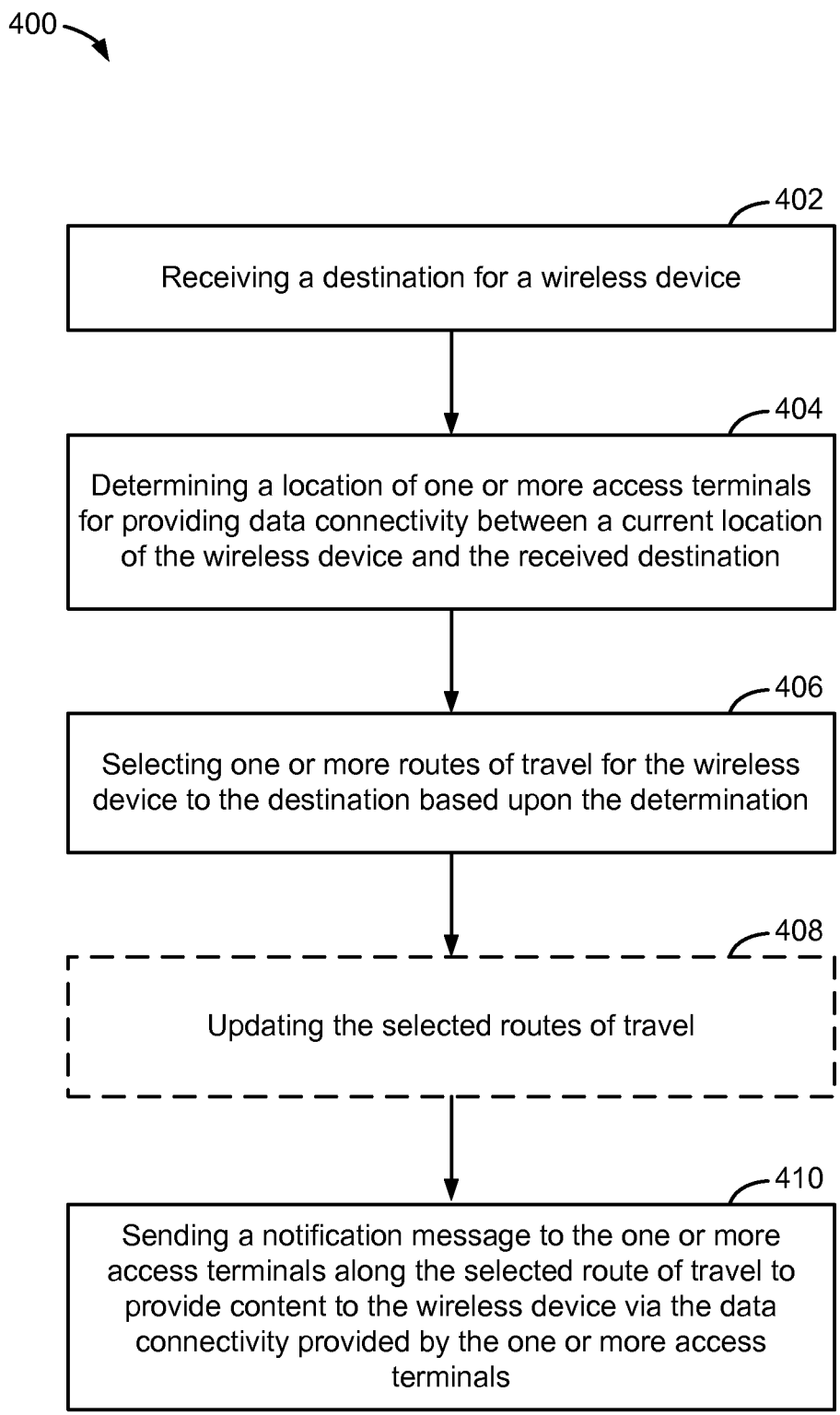
FIG. 4 is a flow chart illustrating a method for content delivery in accordance with an aspect.

Referring now to FIG. 4, a method 400 for delivering content in accordance with an aspect includes, at 402, receiving a destination for a wireless device. Destinations may include any location towards which the wireless device may be traveling. For example, a user of wireless device 102 (FIG. 1) may enter a name of a location, such as a restaurant name and/or an address of a location into a navigation component 10 (FIG. 1) on the wireless device and wireless device 102 may forward the received destination to server 106 (FIG. 1). In an aspect, the wireless device may be in communication with a navigation system of a vehicle, such as when a user is traveling in a vehicle and may receive the destination from the navigation system of the vehicle. Therefore, a user may enter in a destination via the navigation system on the wireless device and/or via the navigation system on the vehicle.

The method may also include, at 404, determining a location of one or more access terminals for providing data connectivity between a current location of the wireless device and the received destination. For example, server 106 may have a determining component 46 (FIG. 2) that may determine the location of one more access terminals 112 (FIG. 1) between the current location of wireless device and the received destination 108 (FIG. 1) that are capable of providing data connectivity, such as WiFi. It should be noted that the access terminals may be in a fixed location (e.g., at a store and/or gas station) and/or may be capable of moving. Thus, the location of the access terminals may change based upon, for example, whether the access terminal is moving. Server 106 may receive the current location information from wireless device 102 and/or access terminal 112 from location components, e.g., GPS, on the wireless device 102 and/or access terminal 112.

In an aspect, the access terminals may be associated with a particular content provider. For example, if a user of wireless device 102 requested to receive content associated with a particular content provider, the server may only determine the location of the access terminals that are associated with the particular content provider for the content that is requested.

At 406, the method may additionally include selecting one or more routes of travel for the wireless device to the destination based upon the determination. For example, server 106 may select one or more routes of travel to the destination 108 based upon the determination of the location of the one or more access terminals 112. The server may select the routes based upon, for example, the number of access terminals located along the selected route and/or maximizing the amount of contact (e.g. communication within a coverage area) with the one or more access terminals along the selected route. For example, the server may select a route of travel to the destination with the largest number and/or the greatest coverage area of access terminals.

In another aspect, the server may select the routes based upon an available bandwidth of the access terminals located along the route. The available bandwidth may be a function of the range of the data connectivity provided by the access terminal, an amount of data connectivity provided by the access terminal, and/or a number of users accessing the provided data connectivity. For example, the server may determine that an estimated data throughput for a route based upon the available bandwidth may be around 50 megabits per second. In addition, the server may determine that the access terminals along one of the selected routes are currently overloaded with other users accessing the data connectivity provided by the access terminals and may select a different route with a higher available bandwidth for the user to travel on to the destination.

In another aspect, the server may select the routes based upon receiving a request for content from the wireless device. The request for content may be for content the user has expressed an interest in accessing and/or receiving. For example, the user of the wireless device may send a request for a specific movie. Thus, the server may select the routes based upon the access terminals that are capable of providing the specific movie.

In another aspect, the server may select the routes based upon a total distance of travel between the current location of the wireless device and the destination. For example, server 106 may default to selecting the shortest route between the current location of the wireless device and the destination.

It should be noted that the server may use a combination of route selection criteria when selecting routes for traveling to the destination. For example, server 106 may be limited in selecting routes that only exceed the shortest route to the destination by a given amount, e.g. less than 15%. Thus, in one aspect, out of the routes from which the server may select, the server may choose the route with the highest bandwidth that does not exceed the shortest route by a given amount.

In an optional aspect, server 106 may send a presentation to wireless device 102 presenting the one or more selected routes to a user of wireless device 102. In addition, the wireless device may receive a user input selecting one of the routes for traveling to the destination.

The method may optionally include, at 408, updating the selected route of travel. The selected route of travel may be updated based upon predicting the route of travel of the wireless device. For example, server 106 may predict the route of travel or wireless device 102 based upon factors, such as but not limited to, weather conditions, speed of travel of the wireless device, traffic conditions, movement of the wireless device (e.g., degrees of turning), and navigation information from a navigation system associated with the wireless device, among other factors. For example, if the user of the wireless device enters a different destination into a navigation system and/or deviates from the selected route (e.g., missed a turn), the navigation system may interface with a server by notifying the server of the route of travel for the wireless device. In addition, a sensor on the wireless device may receive an input indicating a change in a travel direction for the wireless device, e.g., a change in speed or a degree of a turn.

In an aspect, when wireless device 102 is in communication with a vehicle, the route of travel may be predicted via directional information obtained from a CANBUS system on the vehicle. For example, an onboard compass on a vehicle may report to the server the minute the vehicle turns the steering wheel via, for example, a CANBUS port. In addition, the onboard gyroscope and accelerometers may indicate whether the vehicle is traveling in a straight path. Thus, server 106 may receive real-time information regarding changes in directions of wireless device 102 and update the selected route of travel accordingly.

At 410, the method may further include sending a notification message to the one or more access terminals along the selected route of travel to provide content to the wireless device via the data connectivity provided by the one or more access terminals. The notification message may include the access terminal ID and content provided by the server that wireless device may receive using the data connectivity provided by the access terminal, such as WiFi.

In an aspect, server 106 may predict the amount of time wireless device 102 will be near a first access terminal 112 on the selected route of travel and may send a notification message to the first access terminal 112 with a first amount of content based upon the prediction to provide to wireless device 102 when wireless device is near the first access terminal 112. In addition, server 106 may predict when wireless device 102 will be near a second access terminal 112 on the selected route of travel and may send a notification message to the second access terminal 112 on the selected route of travel with a second amount of content based upon the prediction to provide to wireless device 102 when wireless device is near the second access terminal 112.

By predicting the route of travel, the server may "wake up" access terminals as the wireless device approaches and deactivate access terminals as the wireless device moves away from the area of coverage of the access terminal, changes direction and/or another access terminal starts to provide a different amount of the content to the wireless device. Therefore, the amount of content delivered to and/or stored on each access terminal may be reduced by only sending the amount of content for a time period when the wireless device is predicted to be near each access terminal. By only sending a portion of content for the time period for when the wireless device is predicted to be near each access terminal, the amount of memory used by the access terminal to store the delivered content may be reduced. Moreover, if the access terminal is removed and/or stolen by an individual, the individual would only have access to the portion of the content currently stored on the access terminal instead of accessing, for example, the entire content and/or the content data store. Therefore, security may be increased at the access terminals. It should be noted that the first amount of content and the second amount of content may have a portion of content that overlaps, e.g. in case the travel progression of the wireless device changes and/or to insure uninterrupted content delivery. For example, if the traffic conditions change, the wireless device may arrive at the second access terminal faster than was predicted. By having a portion of the content overlapping between consecutive access terminals, if the travel progression of the wireless device changes (e.g., speeds up and/or slows down), the wireless device is more likely to continuously receive the requested content by having a portion of the delivered content overlapping between consecutive access terminals.

In an example use case, the user of a wireless device may be driving with their family to visit their grandparents and may want to stream a movie while driving. The user may enter the address of their grandparents' house as the destination address into a navigation system associated with the wireless device. The user may also enter in the movie title of the movie that the children would like to view while driving to their grandparents' house. A server in communication with the wireless device may receive the movie title and the destination address of the grandparents' house from the wireless device. The server may determine one or more routes for traveling between the current location of the wireless device and the destination address of the grandparents' house. The determined routes may include one or more access terminals, such as kiosks at a grocery store and/or gas station along the routes that may receive a portion of the movie from the server and provide the received portion of the movie to the wireless device when the wireless device is within the data coverage area of the access terminal.

The server may optionally send a presentation, e.g., a map with the determined routes to the wireless device and additional information regarding the routes. The additional information may include, but is not limited to, route lengths, area of data coverage along the routes, number of access terminals on the routes, number of stop lights and/or stop signs on the routes, and estimated time of travel on the routes. The wireless device may present the received presentation with the determined routes and any additional information regarding the routes to the user of wireless device so that the user may select which route to take to their grandparent's house.

Upon receiving the selected route from the user and/or the server determining the selected route of travel, the server may send notification messages to the access terminals along the selected route delivering a portion of the movie that the access terminal will be providing to the wireless device and notifying the access terminal of a time period for when the access terminal should provide the portion of the movie. As the wireless device moves along the selected route of travel, the access terminals may provide the portion of the movie that was delivered to the access terminal when the wireless device enters into the range of data connectivity provided by the access terminal. Therefore, the wireless device may stream the selected movie while the user drives to the grandparents' house without using the cellular connectivity of the wireless device, but instead, using the data connectivity provided by the access terminals.

Figure 5:
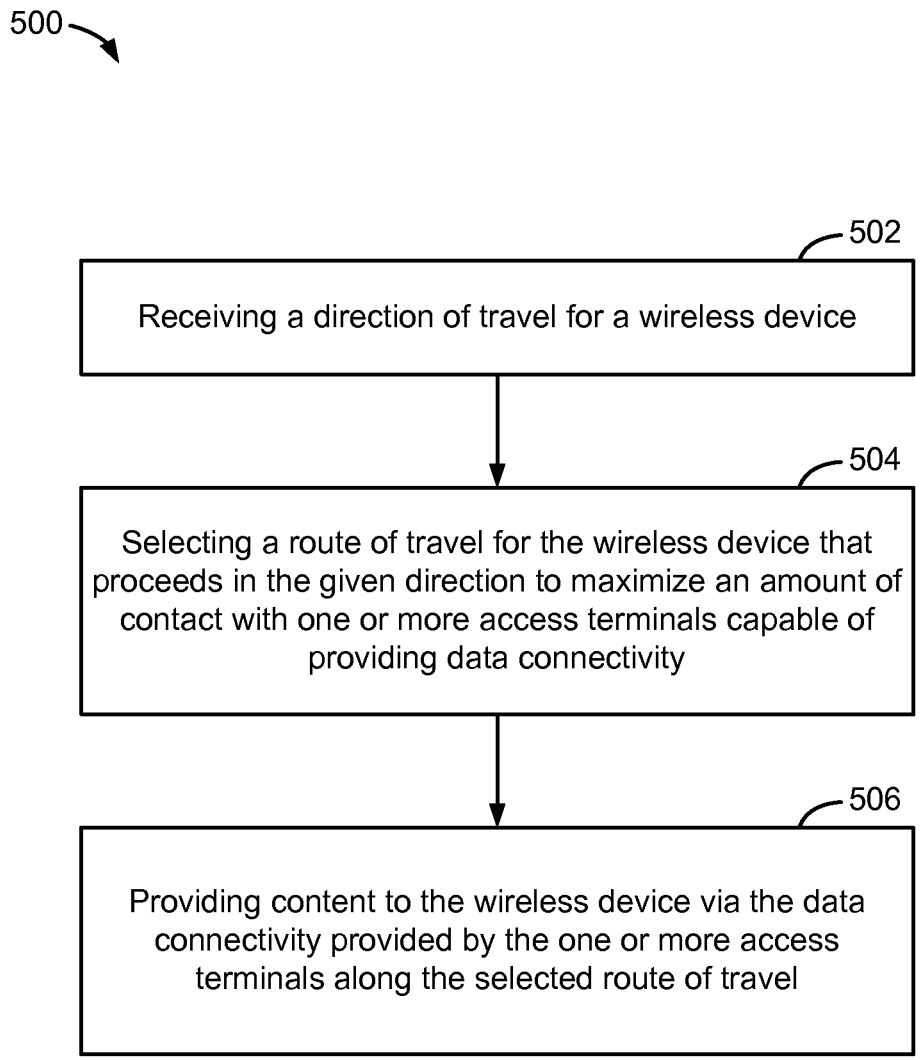
FIG. 5 is a flow chart illustrating a method for content delivery in accordance with yet another aspect.

Referring now to FIG. 5, illustrated is a method 500 for delivering content in accordance with an aspect that includes, at 502, receiving a direction of travel for a wireless device. The direction of travel may include a direction in which the wireless device is traveling. For example, the direction of travel may be towards various locations, such as lunch restaurants or coffee shops. In an aspect, server 106 (FIG. 1) may receive the direction of travel of wireless device 102 (FIG. 1) via a navigation component 10 on wireless device 102 (FIG. 1).

In an aspect, when wireless device 102 is in communication with a vehicle, the direction of travel may be predicted via directional information obtained from a CANBUS system on the vehicle. For example, the onboard compass in a vehicle may report to the server the minute the vehicle turns the steering wheel via, for example, a CANBUS port. In addition, the onboard gyroscope and accelerometers may indicate whether the vehicle is traveling in a straight path.

Next, at 504, the method may include selecting a route of travel for the wireless device that proceeds in the given direction to maximize an amount of contact with one or more access terminals capable of providing data connectivity. For example, server 106 may determine the locations of access terminals 112 (FIG. 1) that are capable of providing the available content via data connectivity provided by the access terminal 112 and/or have available content in the direction of travel of wireless device 102. Server 106 may select a route of travel for wireless device 102 that proceeds in the given direction and that may maximize the amount of contact with the one or more access terminals 112 that are capable of providing data connectivity.

In an aspect, the available content may be based upon content that the user of wireless device expressed an interest in accessing and/or receiving. For example, the user of wireless device may have selected an interest in receiving "Top 40" songs. Therefore, the server may select a route of travel to maximize the amount of contact with the one or more access terminals that have Top 40 songs currently available. It should be noted that there may be additional content that is available for download at each access terminal but the additional content may not be used in selecting a route of travel for the wireless device because the additional content may not be determined to be of interest to the user.

In another aspect, the available content may be based upon a predicted arrival time of the wireless device at the access terminal. For example, the speed of travel of the wireless device may be determined by a navigation component on the wireless device that can calculate how fast the wireless device is moving. In addition, if the wireless device is in communication with a vehicle, the navigation component on the wireless device may communicate with the CANBUS system on the vehicle to determine the speed of travel.

It should be noted that the route of travel may be updated frequently based upon the movement of the access terminals towards and away from the wireless device and/or based upon the speed of travel of the wireless device.

At 506, the method may further include providing content to the wireless device via the data connectivity provided by the one or more access terminals along the selected route of travel. For example, server 106 may send content to the access terminals 112 to provide to wireless device 102 along the selected route. In addition, access terminals 112 may have content stored locally at the access terminals 112 and may provide the content that is stored at the access terminal 112 to wireless device 102 via the data connectivity provided by the access terminal 112.

In an example use case, a user of a wireless device may be in a shopping center and traveling in a direction towards a particular store. The user may be able to walk towards the store on various levels of the shopping center. The server may receive the direction of travel of the wireless device and determine the locations of various access terminals within the shopping center that are capable of providing data connectivity and the available content from each of the access terminals. The server may select a route of travel for the wireless device in the direction of the store to maximize the amount of contact with the one or more access terminals. For example, the server may determine that the route on the upper level towards the direction of the store may provide the user of wireless device with 7 songs and 1 game. The server may determine that the route on the lower level towards the direction of the store may provide the user of wireless device with 3 songs. In one aspect, the server may select the route on the upper level to maximize the amount of content the user may receive while walking in the direction of the store.

In another example use case, a user may be traveling in the direction of various restaurants for lunch. The user may provide the server with the direction of travel, e.g., lunch locations within a mile radius of my current location. The server may determine one or more lunch locations within a mile radius of the current location of the wireless, device, determine the amount of content available at each of the lunch locations within the radius, and present a map with the various locations and the available content. The user of the wireless device may view the map with the various lunch locations and the available content at the various lunch locations. Thus, the server may generate a "heat" map of locations, e.g., a highlighted representation of an area, where content that the user may be interested in is currently located in relation to the wireless device. It should be noted that the heat map generated may continuously be updated based upon, for example, the movement of the access terminals (e.g., access terminals moving towards and/or away from the various locations).

Figure 6:
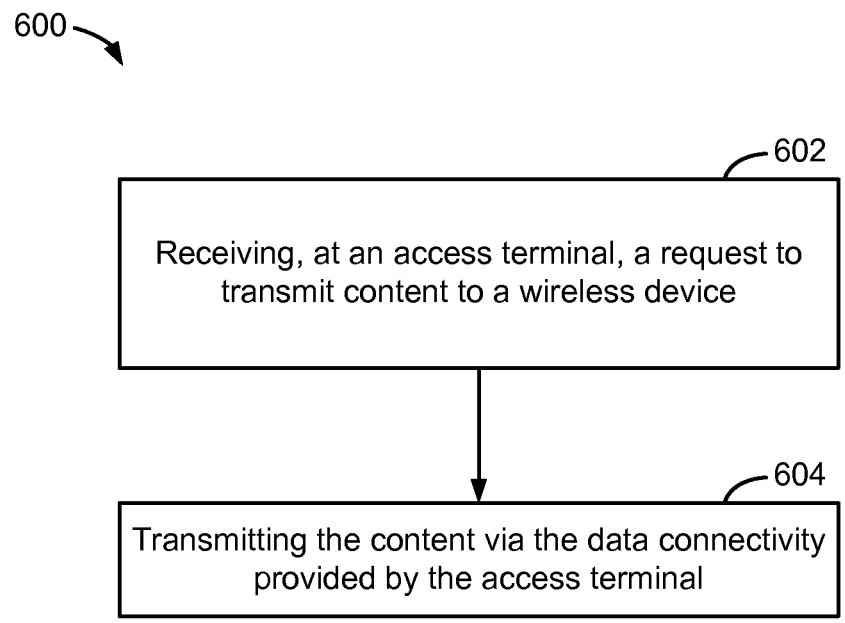
FIG. 6 is a flow chart illustrating a method for content delivery in accordance with another aspect.

Referring now to FIG. 6, illustrated is an example method 600 for delivering content in accordance with an aspect that includes, at 602, receiving, at an access terminal, a request to transmit content to a wireless device. For example, server 106 may send a request, such as notification message 36 that may include the content to deliver to wireless device 102 and a time period to deliver the content. The time period may be based upon an estimated arrival time of the wireless device at the access terminal. The estimated arrival time may be based upon weather conditions, the speed of travel of the wireless device, traffic conditions, and the mode of transportation of the wireless device. In an aspect, the content may already be located at the access terminal 112.

In an aspect, the request to transmit content may be received directly from wireless device 102. For example, wireless device 102 may discover and communicate with access terminal 112 directly via, for example, a peer-to-peer communication link, such as Bluetooth or WiFi-Direct. Access terminal 112 may determine whether one or more parameters for sharing content should be implemented and/or applied when transmitting the content. Parameters for sharing content may include, but are not limited to, the degree of contacts to share the content with (e.g., first and second degree contacts); the type of connectivity to use when sharing the content (e.g., WiFi or Bluetooth); a trade requirement (e.g. the other user is required to trade content in exchange for receiving content); a share ratio (e.g., a percentage of content that the other user owns in relation to the amount of content that the other user shares with individuals); a maximum proximity for sharing the content (e.g., within in the same location of the user); and a fee requirement (e.g., receiving a payment in exchange for sharing content); among other parameters for sharing content.

Access terminal 112 may implement one or more parameters for sharing content before transmitting the content. For example, access terminal 112 may only share content with first or second degree contacts. Thus, access terminal 112 may determine whether wireless device 102 is a first or second degree contact before transmitting the requested content to wireless device 102. For example, access terminal 112 may accesses a contact book on access terminal 112 and/or a social media account associated with the user of access terminal 112 to determine whether wireless device 102 is a first degree or second degree contact. In addition, access terminal 112 may decide not to transmit content to wireless device 102 if access terminal 112 determines that wireless device 102 is not a first or second degree contact.

In another example, access terminal 112 may charge a fee in exchange for sharing content. For example, access terminal 112 may require wireless device 102 to pay a fee, e.g., two (2) cents, in exchange for receiving the requested content. It should be noted that access terminal 112 may implement and/or apply one or more parameters for sharing content before transmitting the requested content to wireless device 102.

At 604, the method may include transmitting the content via the data connectivity provided. For example, access terminal 112 may have data connectivity, such as WiFi or Bluetooth, and may transmit the content to wireless device 102 via the data connectivity.

Figure 7:
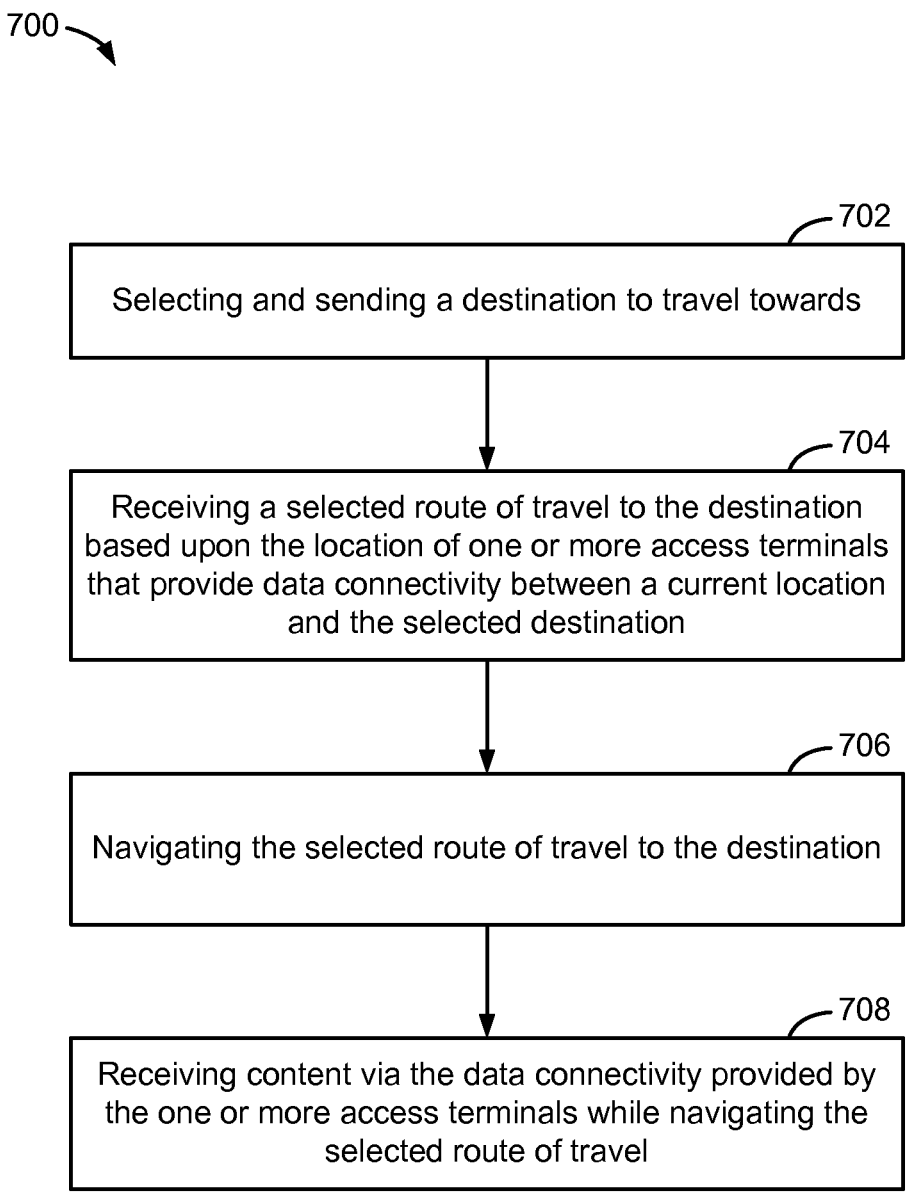
FIG. 7 is a flow chart illustrating a method for receiving content in accordance with an aspect.

Referring now to FIG. 7, illustrated is an example method 700 for receiving content in accordance with an aspect that includes, at 702, selecting and sending a destination toward which to travel. Destinations may include any location towards which the wireless device may be traveling. For example, a user of wireless device 102 (FIG. 1) may enter a name of a location, such as a restaurant name and/or an address of a location into a navigation component 10 (FIG. 1) on the wireless device and wireless device 102 may forward the received destination to server 106 (FIG. 1).

At 704, the method may include receiving a selected route of travel to the destination based upon the location of one or more access terminals that provide data connectivity between a current location and the selected destination. For example, server 106 may determine the locations of access terminals 112 (FIG. 1) that are capable of providing data connectivity. Server 106 may select a route of travel for wireless device 102 that proceeds towards the received destination and that may maximize the amount of contact with the one or more access terminals 112 that are capable of providing data connectivity. Server 106 may send the selected route of travel to the navigation component 10 on wireless device 102.

In addition, at 706, the method may include navigating the selected route of travel to the destination. For example, navigation component 10 may navigate wireless device 102 along selected route of travel to the destination. In an aspect, the selected route of travel may be updated based upon, for example, traffic information, a current speed of the wireless device, weather information, and/or navigation information from a navigation system associated with the wireless device.

When the selected route of travel changes, the method may optionally include receiving a notification indicating that the selected route of travel has changed. The notification may include, for example, the wireless device vibrating, an alarm, or a voice message indicating that the route has changed.

At 708, the method may include receiving content via the data connectivity provided by the one or more access terminals while navigating the selected route of travel. For example, server 106 may send content to the access terminals 112 to provide to wireless device 102 along the selected route.

In addition, access terminals 112 may have content stored locally at the access terminals 112 and may provide the content that is stored at the access terminal 112 to wireless device 102 via the data connectivity provided by the access terminal 112.

Figure 8:
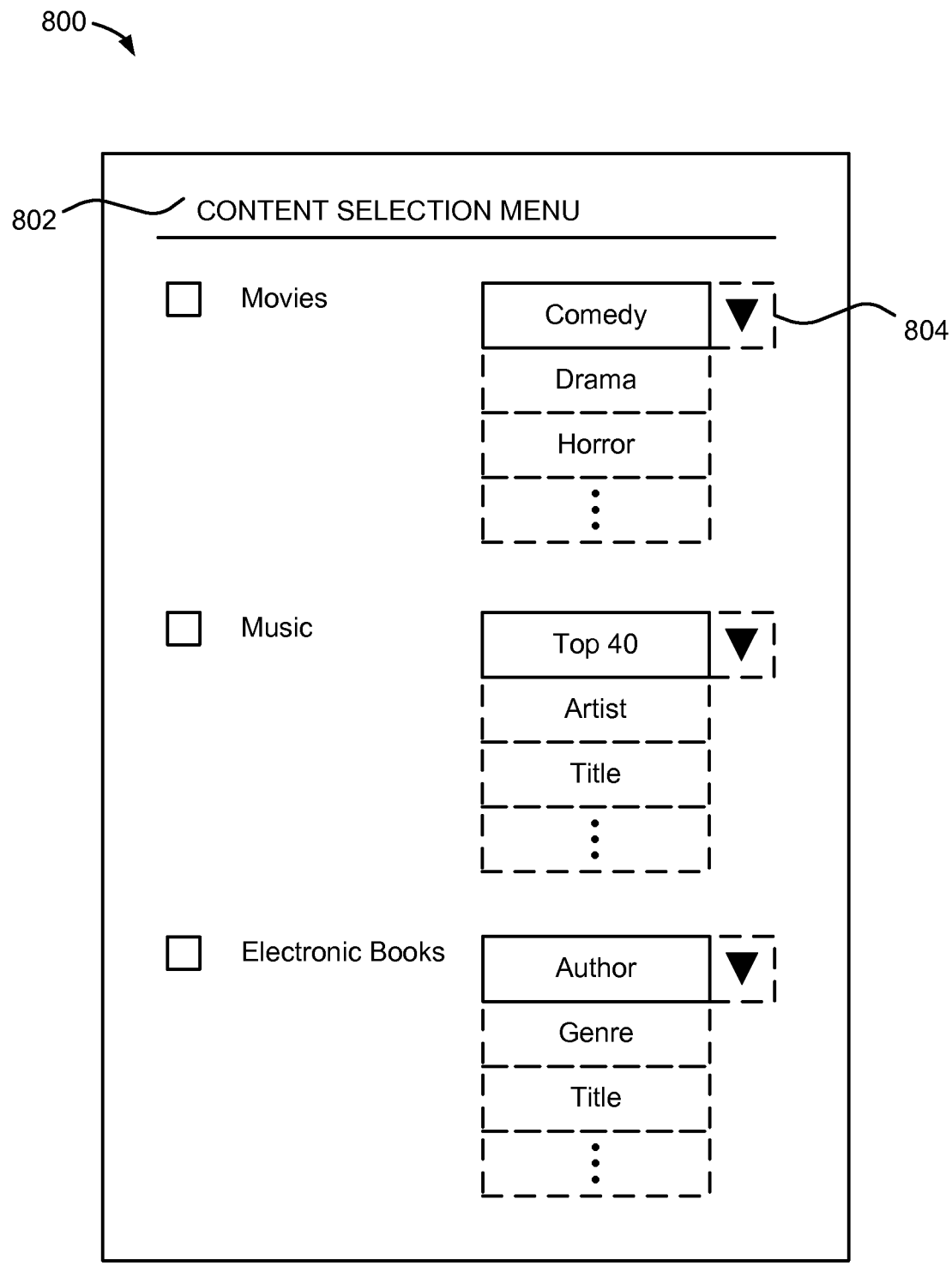

Referring now to FIG. 8, illustrated is an example user interface 800 that may be presented to a user of wireless device 102 (FIG. 1). Interface 800 may present a content selection menu 802 which allows a user to select content to access and/or receive via wireless device 102. The user may also select genres and/or subcategories 804 of the selected content. For example, when a user selects music as the content, the user may also select a particular artist, genre of music and/or a title of a song to access and/or receive.

In an aspect, the information collected via user interface 800 may be used by server 106 (FIG. 1) to determine which content the user of wireless device 102 may be interested in accessing and/or receiving. For example, if a user selects country music songs by a particular artist, the server may determine that the user may also be interested in other country music songs by another artist. In addition, if the user selects a particular movie title, the server may provide the requested movie title to the user. It should be noted that the user may periodically update the server with the type of content the user may be interested in accessing and/or receiving.

Referring now to FIG. 9, illustrated is an example interface 900 that may be presented to a user of wireless device 102 (FIG. 1) and/or access terminal 112 (FIG. 1). Interface 900 may present a content selection menu 902 which allows a user to select content that the user may have a copy of and is willing to share with other users. The content selection menu 902 may present various types of content, such as but not limited to, movies, music, electronic books and/or games that the user may own. In addition, the content selection menu 902 may present listings 904 of particular content, such as specific movie titles, song titles, or electronic books that the user owns. In aspect, the user may select to share a general category of content and/or may select a particular piece of content to share, e.g., a game or movie.

In addition, interface 900 may allow a user to select which individuals may receive the selected content 906. For example, the user may select to always share the selected content with other individuals, only share the content with contacts (e.g., individuals the user may have a relationship with), or never share the selected contacts with other individuals. Thus, the user may control with whom the selected content may be shared.

Figure 10:
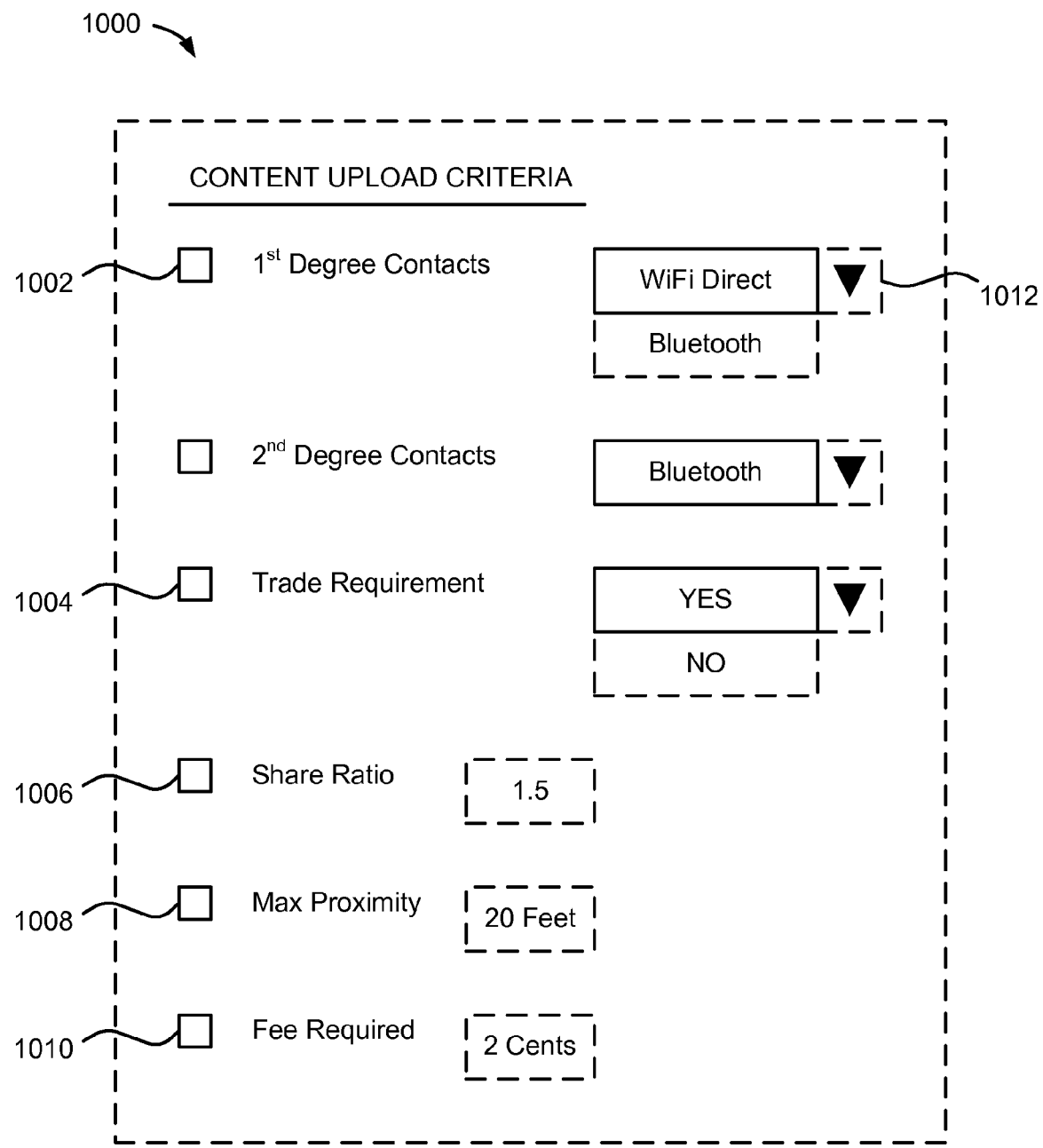

Referring now to FIG. 10, illustrated is an example interface 1000 that allows the user to select one or more parameters for sharing the content. Parameters for sharing the content may include the degree of contacts 1002 with whom the content can be shared. For example, the user may select first degree contacts (e.g., contacts that the user has a direct relationship) and/or second degree contacts. The degree of contacts to the user may be determined, for example, via a contact book associated with the wireless device, call logs on the wireless device, and/or social media accounts of the user.

Parameters for sharing may also include the type of connectivity 1012 to use when sharing the content. For example, the user may select to use a connectivity that requires more device power, such as WiFi direct when sharing content with first degree contacts. In addition, the user may select to use a connectivity that uses less device power, such as Bluetooth when sharing content with second degree contacts. Therefore, a user may conserve device power by determining various forms of connectivity to use when sharing content with other users.

Moreover, parameters for sharing may include a trade requirement 1004. In an aspect, the user may select whether the other user is required to trade content in exchange for receiving content. For example, if a user of wireless device 102 was eating in the same restaurant as access terminal 112 and would like to download a game from access terminal 112, access terminal 112 may require that wireless device 102 provide content to access terminal 112 in exchange for the requested game.

Parameters for sharing may further include a share ratio 1006 indicating the percentage of content that the other user owns in relation to the amount of content that the other user shares with individuals. For example, the user may select a share ratio of 1.5. Therefore, when another user requests to access content from the user and the user does not meet the share ratio selected by the user, the other user may not be able to access the requested content. In an aspect, server may have a data store with the accumulated share ratios of the wireless devices and/or access terminals. The access terminal may communicate with the server to determine the share ratio of the wireless device that is requesting the content before sharing the content.

Parameters for sharing may additionally include a maximum proximity for sharing the content 1008. In an aspect, a user may restrict the radius of sharing the content to individuals who are in the same location of the user and/or attending the same event as the user. For example, the access terminal may receive device locations of other devices and may determine whether the other devices are within the selected proximity for sharing the content.

Parameters for sharing may also include a fee requirement 1010. A user may require that a fee be paid for accessing and/or receiving requested content. For example, the user may choose to charge a lower fee than various content providers and may act as a host for providing access to the requested content. In an aspect, users of wireless devices may provide micropayments via peer-to-peer communication systems in exchange for content. For example, a user of a wireless device may receive a song from another user of a wireless device via a peer-to-peer communication system, and may pay three (3) cents, for example, in return for the song. It should be noted that a variety of share parameters may be used in addition to and/or alternatively to the above mentioned share parameters.

Figure 11:
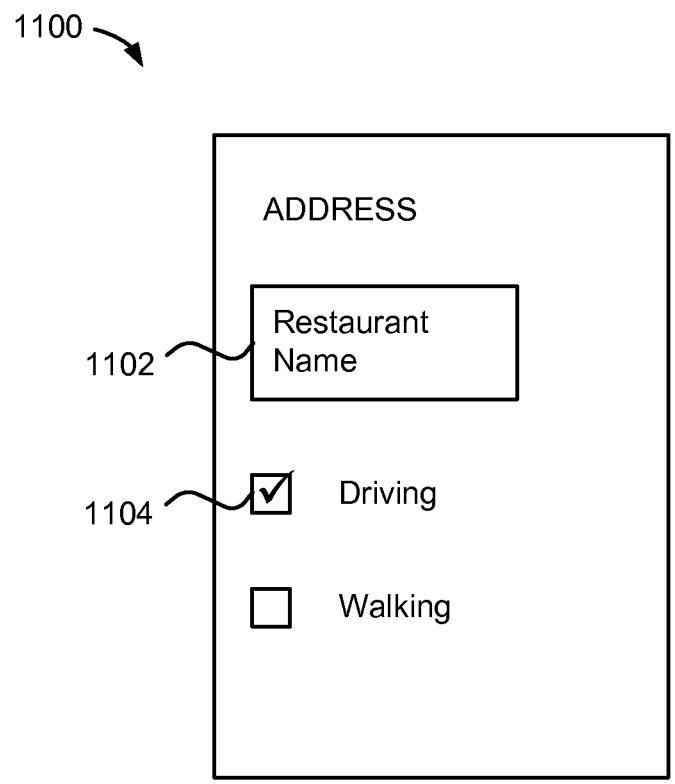

Referring now to FIG. 11, illustrated is an example interface 1100 for receiving inputs for a destination address 1102 and a mode of transportation 1104 to the destination. Destination addresses may include, but are not limited to, a name of a location (e.g., a restaurant name, a hotel name, a shopping center name, work, home, etc.) and/or an address of a location. In addition, a user may select a mode of transportation to the destination address, such as walking or driving. For example, a navigation component of a wireless device may display interface 1100.

Figure 12:
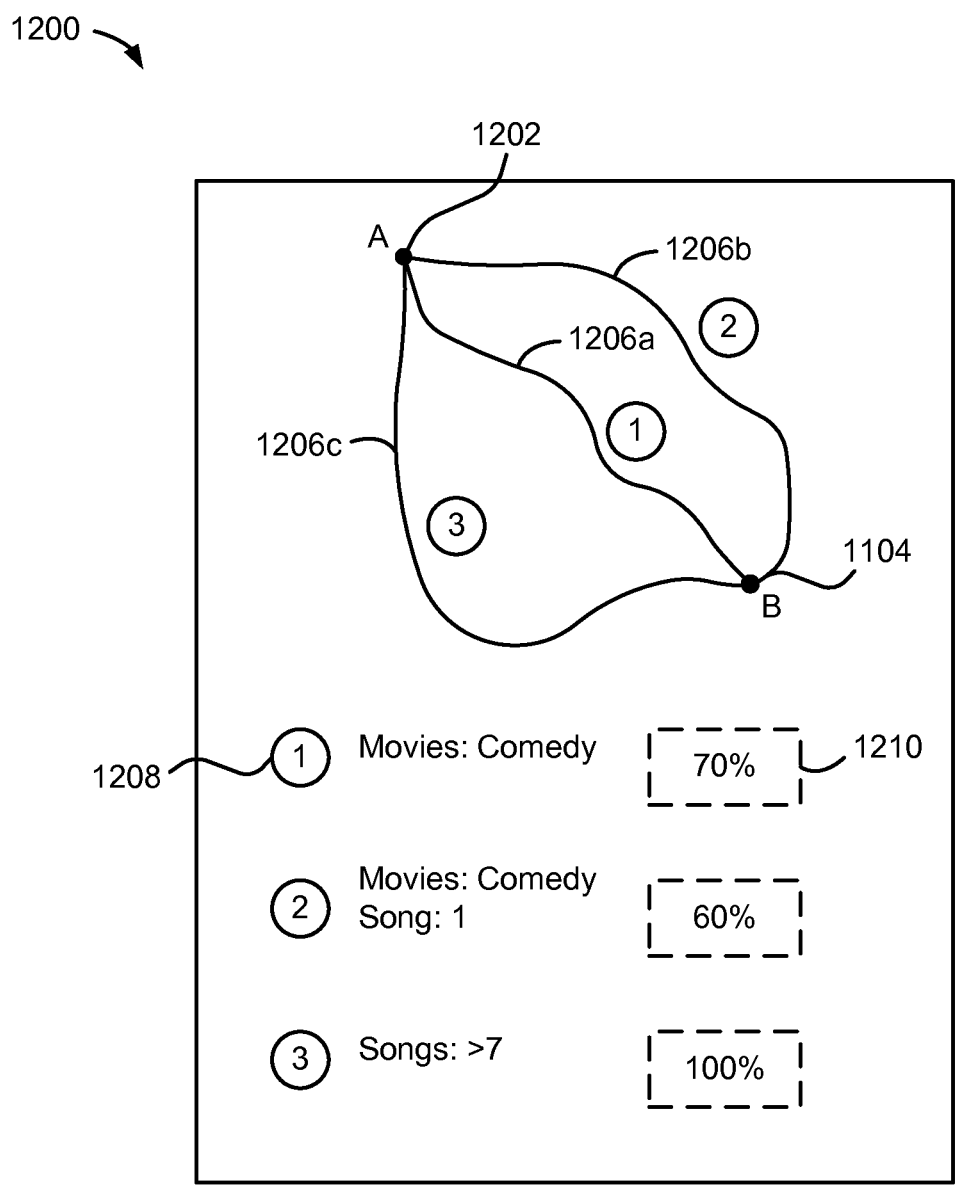

Referring now to FIG. 12, illustrated is an example interface 1200 that may be presented with one or more routes 1206 from the current location of the wireless device 1202 to the received destination address 1204. In addition, interface 1200 may include a list 108 of the type and/or amount of content available on each of the routes 1206. For example, on route 1206a, comedy movies may be available to access and/or download. On route 1206b, comedy movies and a song may be available to access and/or download. In addition, on route 1206c several songs may be available to access and/or download. Interface 1200 may further include a confidence level 1210 for the determined content that may be available on each of the routes 1206. For example, the confidence level 1210 for comedy movies on route 1206a may be 70%. Thus, if a user selects to travel along route 1206a, the user may have a 70% chance accessing and/or downloading comedy movies while traveling along route 1206a.

In an aspect, interface 1200 may be presented to a user of wireless device 102 (FIG. 1). Routes 1206 may be selected by server 106 (FIG. 1) based upon, for example, a type of content that a user of wireless device 102 may be interested in and/or the available content from one or more access terminals 112 (FIG. 1) along the selected routes. The confidence level 1210 presented for the available content may be updated based upon, for example, the movement of wireless device 102 and/or the movement of the access terminals 112.

Figure 13:
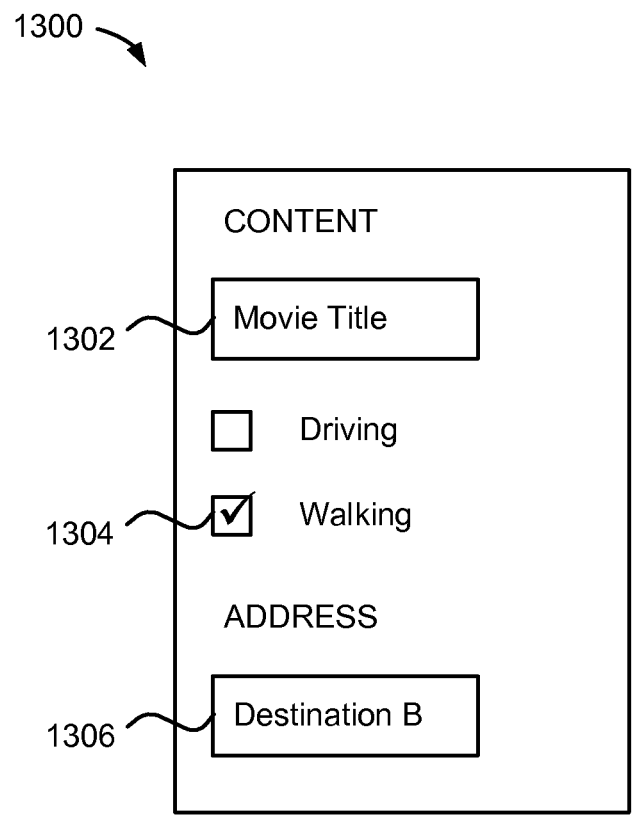

Referring now to FIG. 13, illustrated is an example interface 1300 that may be presented to a user of a wireless device that allows the user to enter a request for content 1302, a destination address 1306, and a mode of transportation 1304 (e.g., walking and/or driving) for traveling to the destination address 1306. For example, the request for content 1302 may include a specific title of the content, e.g., a movie title.

Figure 14:
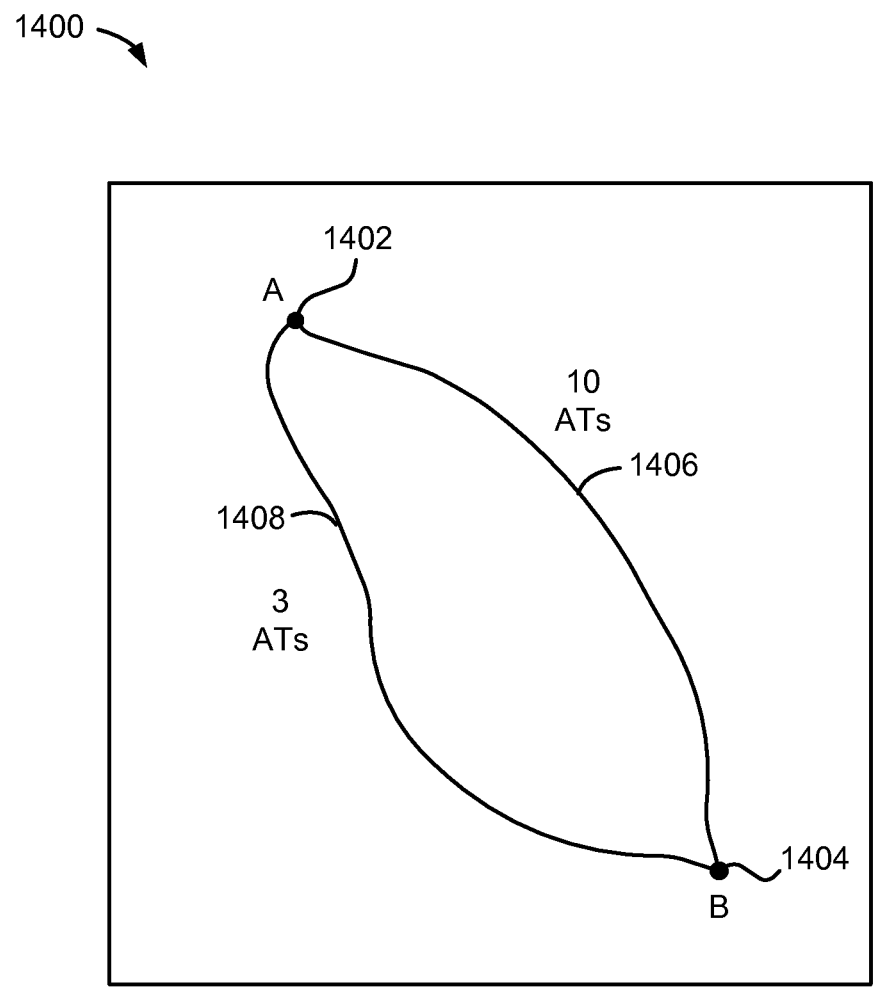

Referring now to FIG. 14, illustrated is an example interface 1400 that may be presented to a user of a wireless device after the information is received from interface 1200 (FIG. 12). Interface 1400 may present various routes 1406, 1408 from the current location of the wireless device 1402 to the received destination address 1404. In addition, interface 1400 may present a number of access terminals that are positioned along the route. For example, route 1406 may have 10 access terminals along the route that may be able to provide data connectivity for the requested content. In addition, route 1408 may have 3 access terminals along the route that may be able to provide data connectivity for the requested content. In an aspect, the access terminals may be in a fixed location, such as a kiosk at a gas station or a grocery store along the selected route. Routes 1406 and 1408 may be determined by a server based upon an optimal route to destination 1404. For example, the server may have a route threshold that is used when determining routes 1406 and 1408. For example, the route threshold may prevent the additional length of the selected routes as compared to the shortest route, e.g., routes 1406 and 1408 may not be more than a given percentage, e.g. 15%, longer than the shortest route and/or may not be more than a given number of miles from the shortest route.

Moreover, the access terminals may have various coverage areas where a user of wireless device may be able to receive data connectivity from the access terminals. For example, the three access terminals on route 1408 may include a broad WiFi range so when a user is traveling along route 1408, the user may receive more data passing by the three access terminals on route 1408 than the user may receive when passing by the ten access terminals on route 1406. Therefore, the user of the wireless device may have various options for selecting which route to use when traveling to destination 1404.

Figure 15:
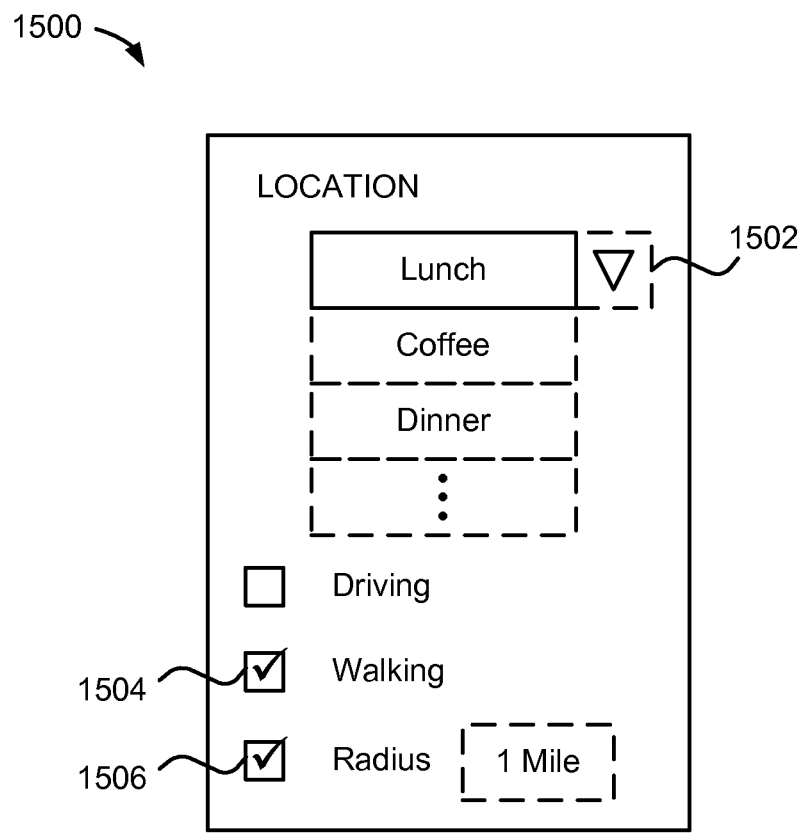

Referring now to FIG. 15, illustrated is an example interface 1500 that may be presented to a user of a wireless device. Interface 1500 may allow a user to select a type of location 1502, a mode of transportation 1504, and a radius 1506 from the current location of the wireless device. For example, a user may select lunch locations within a mile of the current location of the wireless device. In addition, the user may select that they would like to walk to a lunch location.

Figure 16:
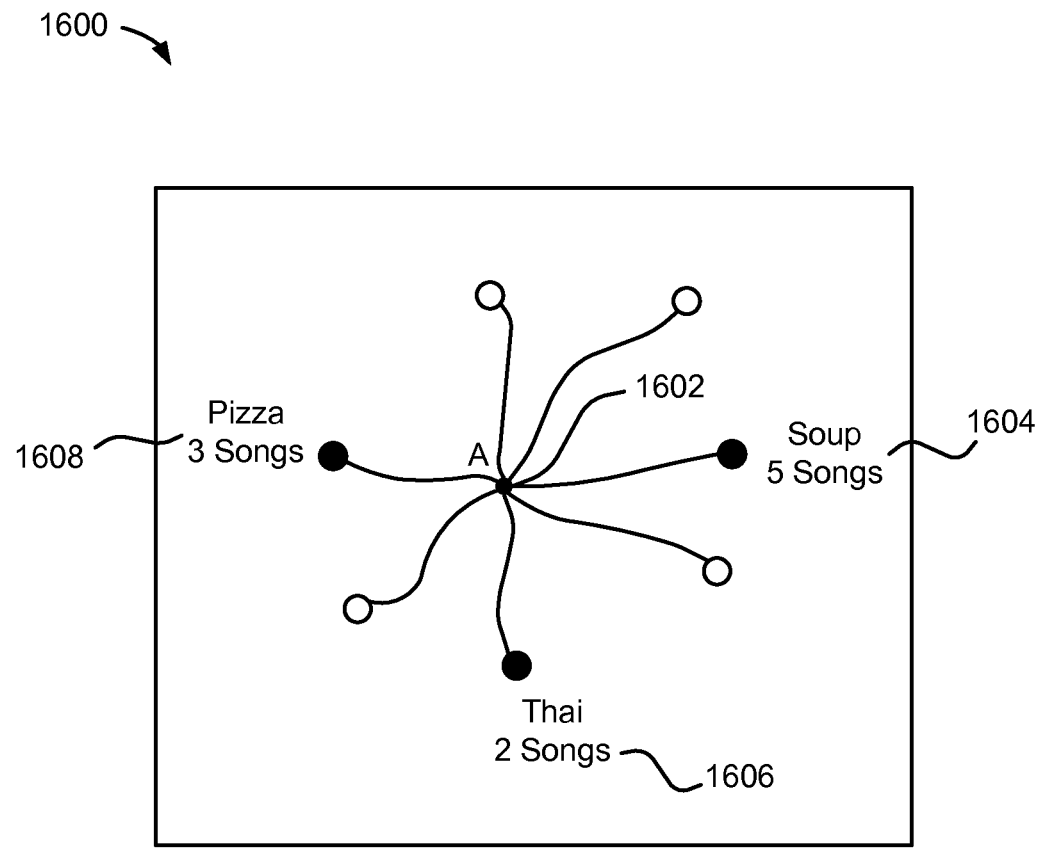

Referring now to FIG. 16, illustrated is an example interface 1600 that may be presented after the information is received from interface 1500 (FIG. 15). Interface 1600 may present a map of various locations 1604, 1606, and 1608 that may provide lunch within the selected radius of the current location 1602. In addition, interface 1600 may present the available content at each of the various locations 1604, 1606, and 1608. For example, at location 1608, the user may be able to get pizza for lunch and there may be 3 songs available for download from other access terminals that are at location 1608. At location 1604, the user may be able to get soup for lunch and there may be five (5) songs available for download from other access terminals that are at location 1604. Location 1606 may have Thai food for lunch and there may be two (2) songs available for download from other access terminals that are at location 1606.

It should be noted, however, that the wireless devices at the location, may not be within proximity of each other to be able to communicate via a peer-to-peer communication. For example, the wireless devices may be too far from each other to communicate over a short range peer-to-peer communication link, such as Bluetooth, WiFi-Direct, etc. In an aspect, the server may send out a message notifying the users of the wireless devices in the particular restaurant and/or near the restaurant that if the users move to one area of the restaurant, e.g., the southwest corner of the restaurant, the users may be able to share content with each other. For example, the message may include, but is not limited to, an e-mail message, an SMS message, or a text message. Thus, the server may create meet ups between users of wireless devices in a location by sending out a central location for the users to move towards to share content.

In an aspect, the available content presented at locations 1604, 1606, and 1608 may be based upon content that the user of wireless device expressed an interest in accessing and/or receiving. For example, the information captured by interface 800 (FIG. 8) may be used in determining what types of content the user may want to access and/or download. Thus, there may be additional content that is available for download at each of locations 1604, 1606, and 1608 that is not presented on interface 1600 because the additional content may not be determined to be of interest to the user.

In another aspect, the available content may be based upon a predicted arrival time of the wireless device at the location. If the user of wireless device is walking to the lunch location, the estimated arrival time may be longer than if the user selected to drive to the lunch location. For example, the speed of travel of the wireless device may be determined by a navigation component on the wireless device that can calculate how fast the wireless device is moving. In addition, if the wireless device is in communication with a vehicle, the navigation component on the wireless device may communicate with the CANBUS system on the vehicle to determine the speed of travel.

It should be noted that the information provided on interface 1600 may be updated frequently based upon the movement of the access terminals towards and away from the location and the speed of travel of the wireless device. Thus, interface 1600 may present a heat map with locations of where the user may be able to access content.

In an example use case, a user of a wireless device may be heading towards a restaurant to eat lunch and may send a content request for music by a particular artist. For example, the user of the wireless device may access interface 800 (FIG. 8) and may send a content request to a server for music by a particular artist. In addition, the user of the wireless device may access interface 1500 (FIG. 15) to indicate that the user is heading towards lunch within a mile radius of the current location of the user. The server may notify the user of the wireless device that songs by the selected artist are available for purchase through a content provider, for example, for 99 cents. The server may also notify the user of the wireless device that if the user heads to location 1604 for lunch, the user may be able to pick up three songs for free at location 1604 using peer-to-peer communications with other wireless devices at location 1604 and/or if the user heads to location 1606 for lunch, the user may be able to pick up 2 songs for free at location 1606 using peer-to-peer communications with other wireless devices at location 1604. Thus, the user may have the option to purchase songs for the selected artist or may choose to eat lunch at location 1604 and/or location 1606 and pick up the songs for free using a peer-to-peer communication, such as WiFi-direct and/or Bluetooth.

Figure 17:
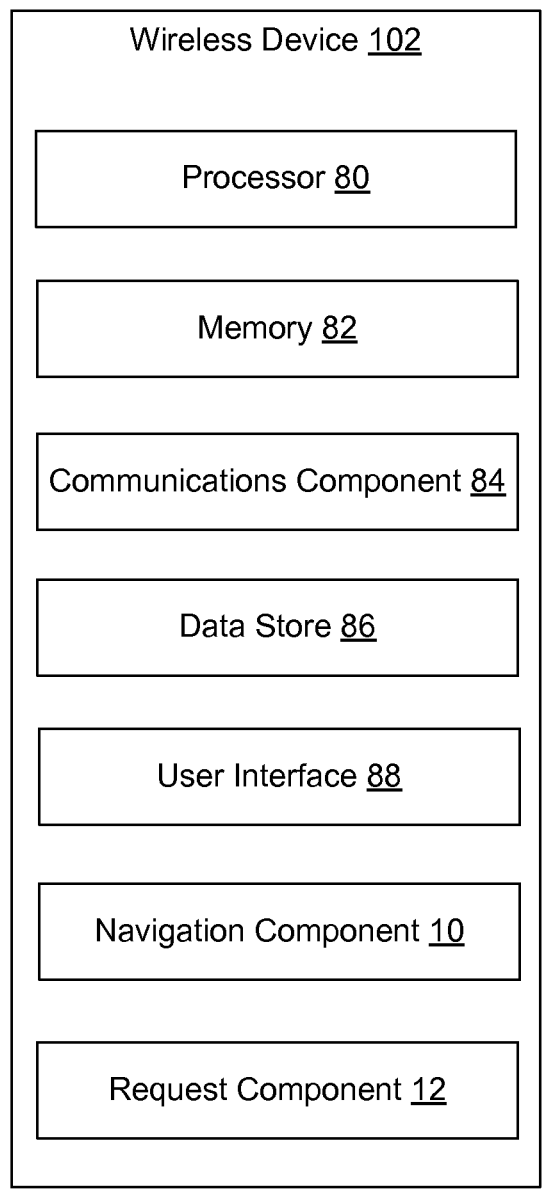
FIG. 17 illustrates an example wireless device operable within the connectivity system in accordance with an aspect.

Referring now to FIG. 17, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further include a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include a navigation component 10 (FIG. 1) operable for receiving a destination and/or determining a direction of travel for wireless device 102. In addition, wireless device 102 may include a request component 12 operable to forward content requests and the destination of travel. In an aspect, user interface component 88 may transmit and/or receive messages corresponding to the operation of navigation component 10 and/or request component 12. In addition, processor 80 executes navigation component 10 and request component 12, and memory 82 or data store 86 may store them.

Figure 18:
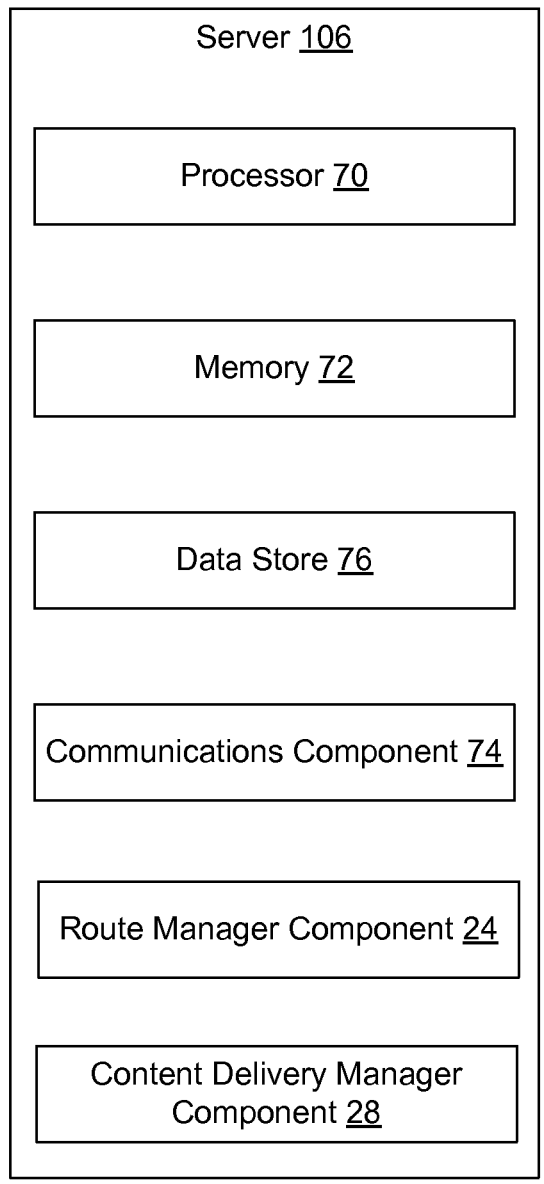
FIG. 18 is an example server device operable within the connectivity system in accordance with yet another aspect.

Referring now to FIG. 18, illustrated is an example sever device 106 operable within the connectivity system in accordance with yet another aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Server 106 may also include a route manager component 24 (FIG. 1) operable determining and selecting one or more routes of travel for wireless device to a destination. Server 106 may also include a content delivery manager component 28 (FIG. 1) operable to manage the delivery of content. In an aspect, communications component 74 may transmit and/or receive messages corresponding to the operation of route manger component 24 and/or content delivery manager component 28. In addition, processor 70 may execute route manger component 24 and/or content delivery manager component 28, and memory 72 may store them.

Figure 19:
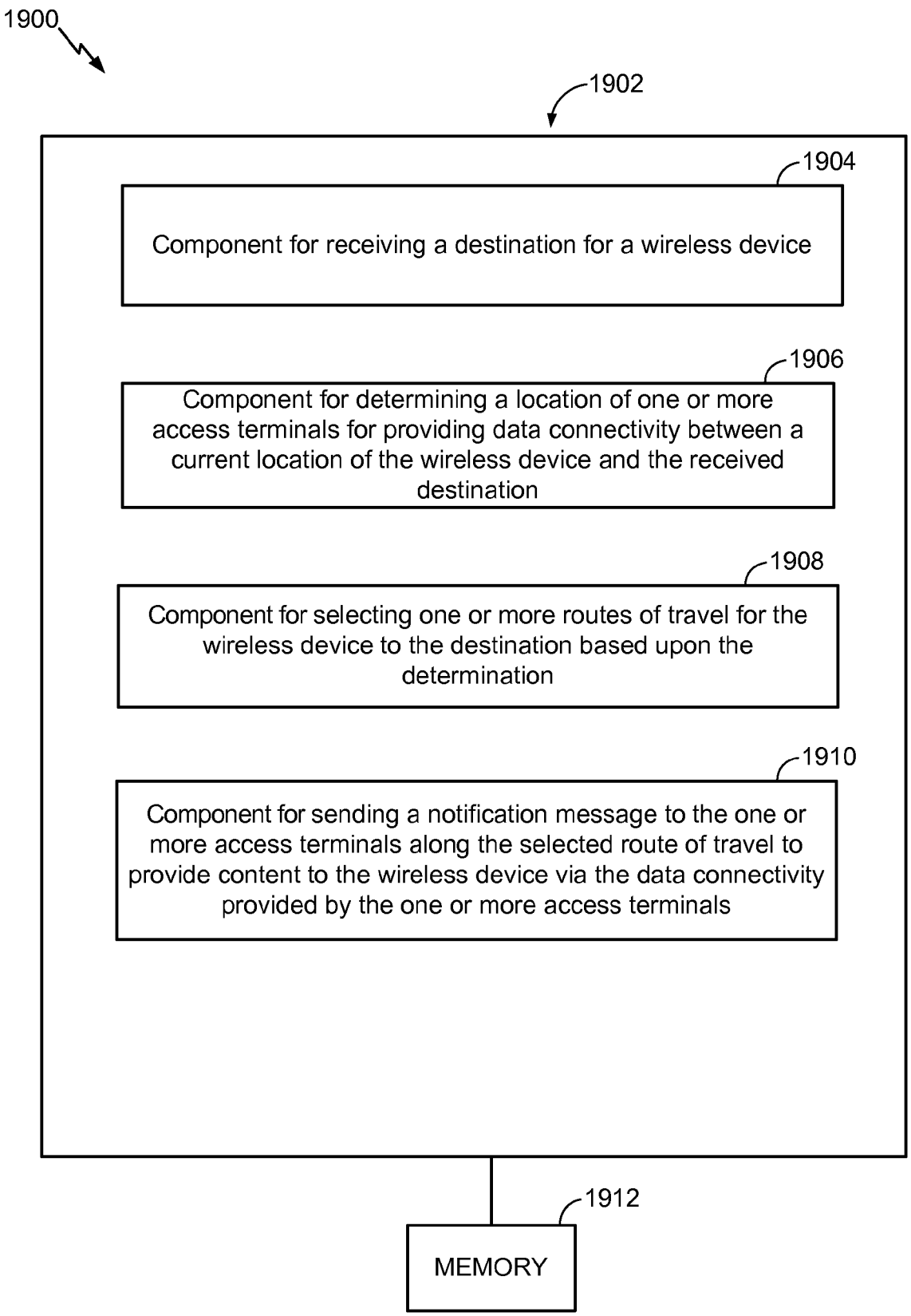
FIG. 19 is an example system that facilitates content delivery in accordance with another aspect.

Referring now to FIG. 19, illustrated is a system 1900 configured to deliver content. For example, system 1900 can reside at least partially within a transmitter, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that facilitate delivering content. For instance, logical grouping 1902 may include component 1904 for receiving a destination for a wireless device. Further, logical grouping 1902 may comprise component 1906 for determining a location of one or more access terminals for providing data connectivity between a current location of the wireless device and the received destination. In addition, logical grouping 1902 may include component 1908 for selecting one or more routes of travel for the wireless device to the destination based upon the determination. Logical grouping 1902 may also include component 1910 for sending a notification message to the one or more access terminals along the selected route of travel to provide content to the wireless device via the data connectivity provided by the one or more access terminals. Additionally, system 1900 can include a memory 1912 that retains instructions for executing functions associated with electrical components 1904, 1906, 1908, and 1910. While shown as being external to memory 1910, it is to be understood that one or more of electrical components 1904, 1906, 1908, and 1910 can exist within memory 1912.

Figure 20:
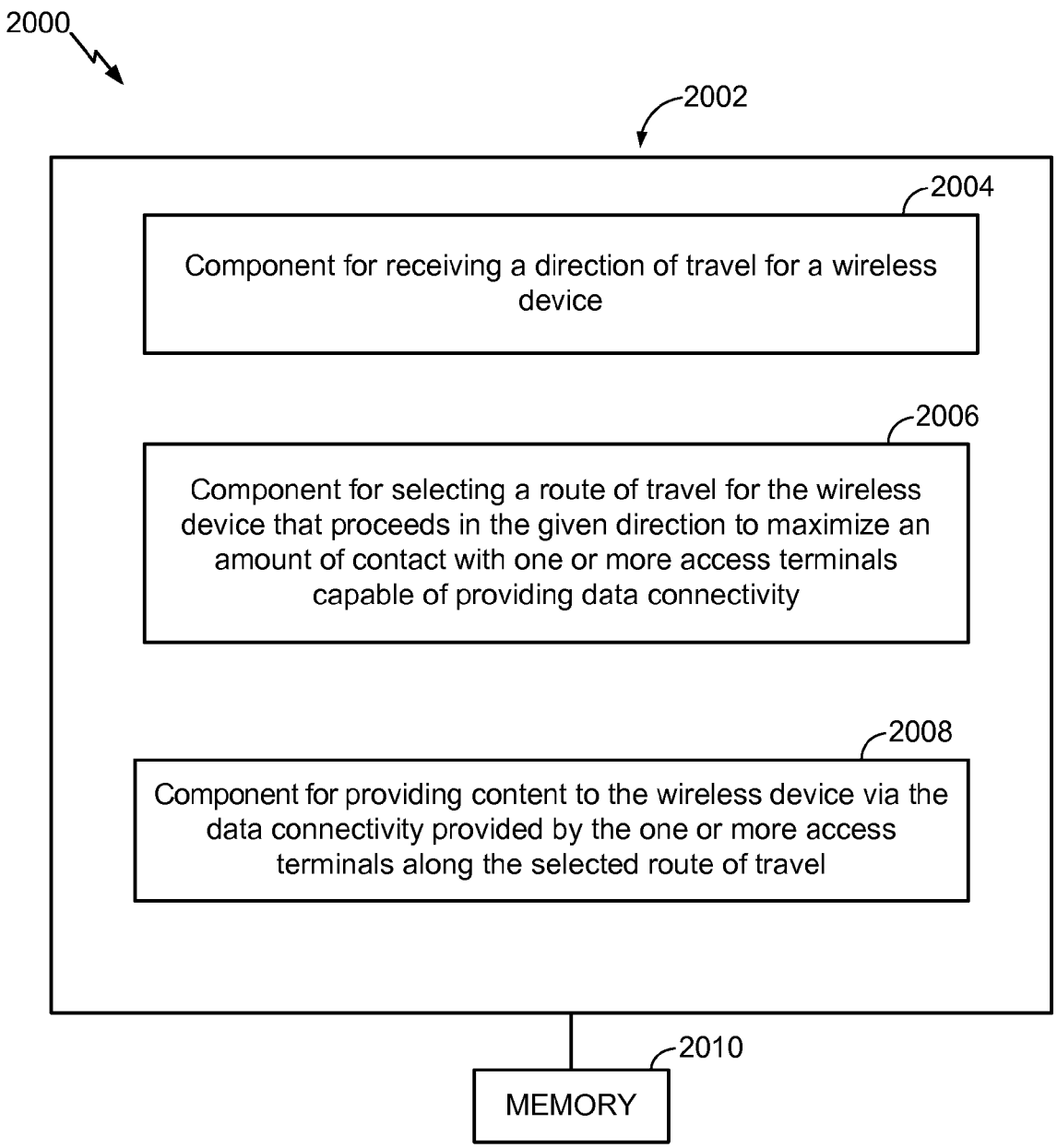
FIG. 20 is an example system that facilitates content delivery in accordance with an aspect.

Referring now to FIG. 20, illustrated is a system 2000 configured to deliver content. For example, system 2000 can reside at least partially within a transmitter, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that facilitate delivering content. For instance, logical grouping 2002 may include component 2004 for receiving a direction of travel for a wireless device. Further, logical grouping 2002 may comprise component 2006 for selecting a route of travel for the wireless device that proceeds in the given direction to maximize an amount of contact with one or more access terminals capable of providing data connectivity. In addition, logical grouping 2002 may include component 2008 for providing content to the wireless device via the data connectivity provided by the one or more access terminals along the selected route of travel. Additionally, system 2000 can include a memory 2010 that retains instructions for executing functions associated with electrical components 2004, 2006, and 2008. While shown as being external to memory 2010, it is to be understood that one or more of electrical components 2004, 2006, and 2008 can exist within memory 2010.

Figure 21:
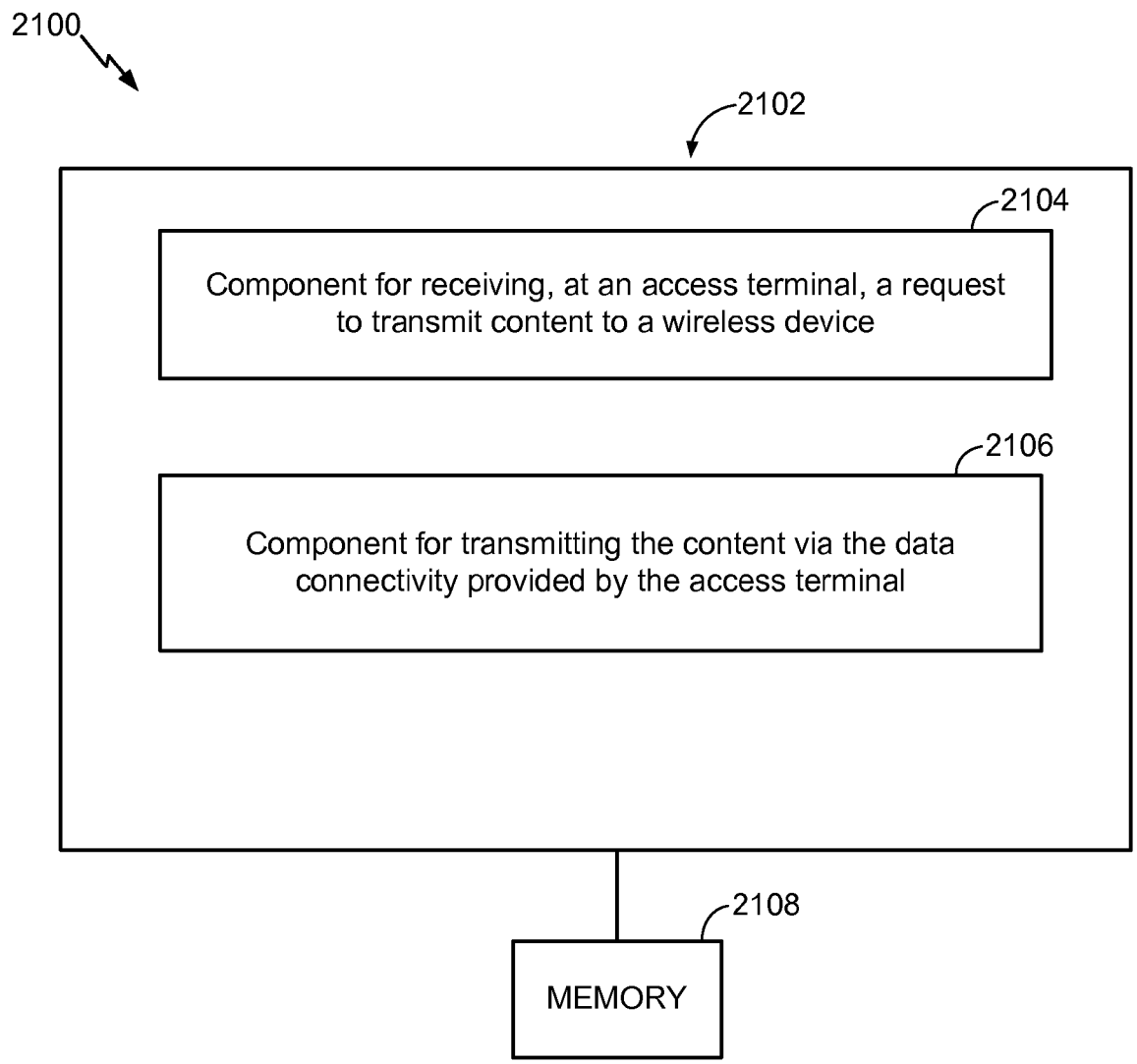
FIG. 21 is an example system that facilitates content delivery in accordance with another aspect.

Referring now to FIG. 21, illustrated is a system 2100 configured to deliver content. For example, system 2100 can reside at least partially within a transmitter, mobile device, etc. It is to be appreciated that system 2100 is represented as including functional blocks, which can be functional blocks that represent functions implemented by a processor, software, or combination thereof (e.g., firmware). System 2100 includes a logical grouping 2102 of electrical components that facilitate delivering content. For instance, logical grouping 2102 may include component 2104 for receiving, at an access terminal, a request to transmit content to a wireless device. Further, logical grouping 2102 may comprise component 2106 for transmitting the content via the data connectivity provided by the access terminal. Additionally, system 2100 can include a memory 2108 that retains instructions for executing functions associated with electrical components 2104 and 2106. While shown as being external to memory 2108, it is to be understood that one or more of electrical components 2104 and 2106 can exist within memory 2108.

Figure 22:
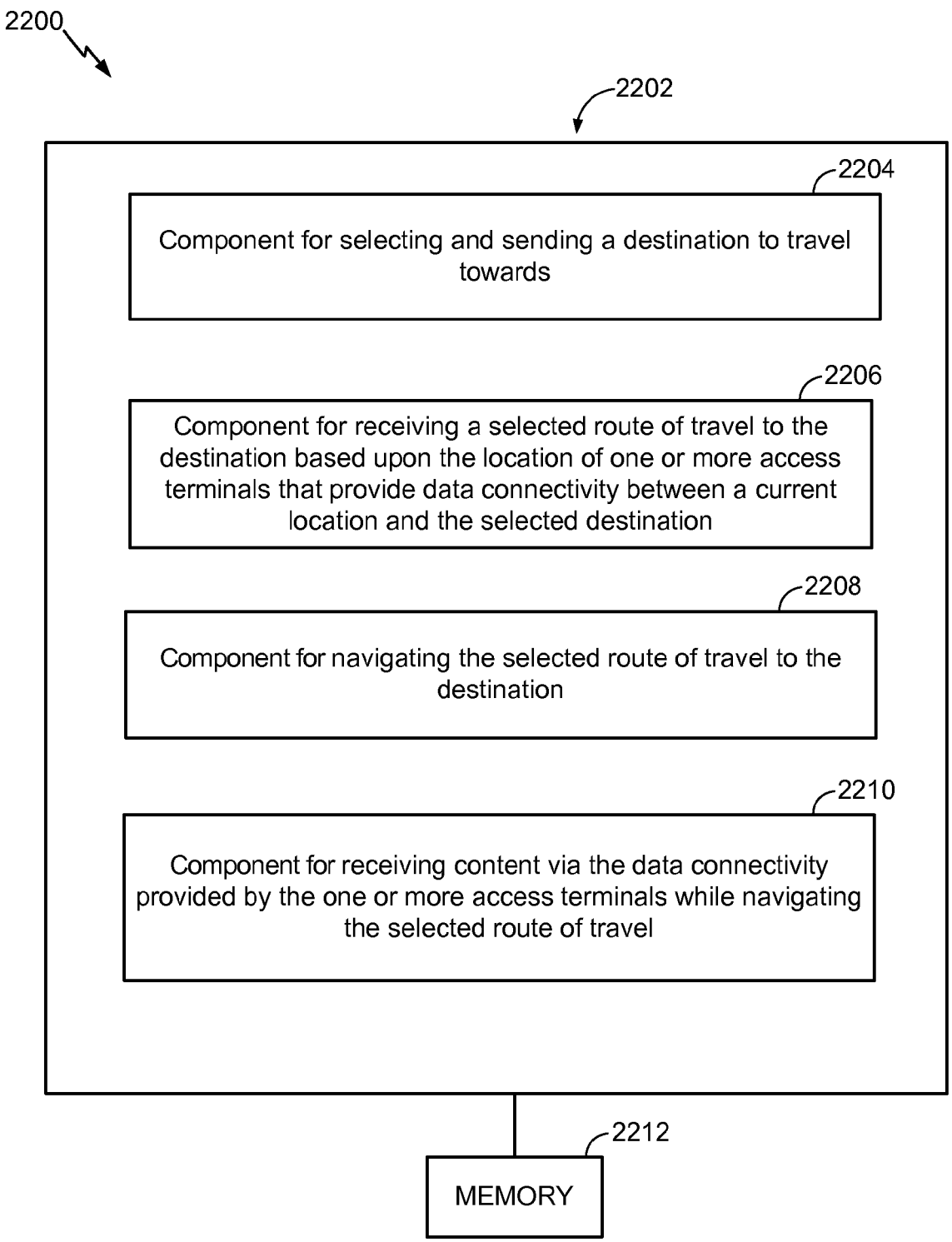
FIG. 22 is an example system that facilitates receiving content in accordance with yet another aspect.

Referring now to FIG. 22, illustrated is a system 2200 configured to receive content. For example, system 2200 can reside at least partially within a transmitter, mobile device, etc. It is to be appreciated that system 2200 is represented as including functional blocks, which can be functional blocks that represent functions implemented by a processor, software, or combination thereof (e.g., firmware). System 2200 includes a logical grouping 2202 of electrical components that facilitate receiving content. For instance, logical grouping 2202 may include component 2204 for selecting and sending a destination to travel towards. Further, logical grouping 2202 may comprise component 2206 for receiving a selected route of travel to the destination based upon the location of one or more access terminals that provide data connectivity between a current location and the selected destination. In addition, logical grouping 2202 may include component 2208 for navigating the selected route of travel to the destination. Logical grouping 2202 may also include component 2210 for receiving content via the data connectivity provided by the one or more access terminals while navigating the selected route of travel. Additionally, system 2200 can include a memory 2212 that retains instructions for executing functions associated with electrical components 2204, 2206, 2208, and 2210. While shown as being external to memory 2210, it is to be understood that one or more of electrical components 2204, 2206, 2208, and 2210 can exist within memory 2212.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as Code Division Multiple Access (CDMA), Time Division Multiple Access (TDMA), FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for delivering content from a server to a wireless device, comprising:
    receiving, by the server, a destination and a request for content from the wireless device;
    determining, by the server, a location of one or more access terminals for providing data connectivity between a current location of the wireless device and the received destination;
    selecting, by the server, one or more routes of travel for the wireless device to the destination based upon the determined location of the one or more access terminals;
    predicting, by the server, a time period the wireless device will be near each of the one or more access terminals along the selected one or more routes of travel; and
    sending, by the server, to each of the one or more access terminals:
        at least a portion of the requested content based upon the predicted time period, wherein the at least portion of the requested content is received in advance of when the wireless device is predicted to be near the respective access terminal of the one or more access terminals; and
        a notification message to provide the respective at least portion of the requested content to the wireless device via the data connectivity when the wireless device is near the respective access terminal of the one or more access terminals.

2. The method of claim 1, wherein receiving the destination comprises receiving the destination from a navigation system associated with the wireless device.

3. The method of claim 2, wherein the navigation system is one of a vehicle navigation system or a navigation system application on the wireless device.

4. The method of claim 1, wherein selecting the one or more routes of travel is further based upon the request for content received from the wireless device.

5. The method of claim 1, wherein selecting the one or more routes of travel further comprises:
    determining a route of travel that maximizes an amount of contact with the one or more access terminals.

6. The method of claim 5, wherein the one or more access terminals are associated with a particular content provider.

7. The method of claim 1, further comprising:
    updating the selected one or more routes of travel based upon one or more of traffic information, a current speed of the wireless device, weather information, or navigation information from a navigation system associated with the wireless device.

8. The method of claim 7, wherein updating the selected one or more route of travel further comprises:
    predicting updates to the selected one or more route of travel based upon an input received from a sensor indicating a change of direction for the wireless device.

9. The method of claim 8, wherein the input comprises one of a speed of travel or a degree of a turn.

10. The method of claim 1, wherein predicting the time period the wireless device will be near each of the one or more access terminals is based upon one or more of traffic information, a current speed of the wireless device, weather information, or navigation information from a navigation system associated with the wireless device.

11. The method of claim 1, wherein:
    sending at least a portion of the requested content to each of the one or more access terminals comprises sending a first amount of content to a first access terminal and a second amount of content to a second access terminal based upon the predicted time periods; and
    sending the notification message to each of the one or more access terminals comprises:
        notifying the first access terminal of a first amount of time that the wireless device will be near the first access terminal; and
        notifying the second access terminal of a second amount of time that the wireless device will be near the second access terminal.

12. The method of claim 11, wherein the first amount of content and the second amount of content have a portion of content that overlaps.

13. The method of claim 11, further comprising:
    deactivating the first access terminal when the second access terminal starts to provide the second amount of content to the wireless device.

14. The method of claim 1, wherein the content comprises one or more of video, text, music, audio, or voice.

15. The method of claim 1, further comprising:
  determining a direction of travel for the wireless device via a Controller Area Network Bus (CANBUS) system on a vehicle associated with the wireless device.

16. A server for delivering content to a wireless device, comprising:
  at least one processor configured with processor-executable instructions to perform operations comprising:
    receiving a destination and a request for content from the wireless device;
    determining a location of one or more access terminals for providing data connectivity between a current location of the wireless device and the received destination;
    selecting one or more routes of travel for the wireless device to the destination based upon the determined location of the one or more access terminals;
    predicting a time period the wireless device will be near each of the one or more access terminals on the selected one or more routes of travel; and
    sending to each of the one or more access terminals along the one or more selected routes of travel:
      at least a portion of the requested content based upon the predicted time period, wherein the at least portion of the requested content is received in advance of when the wireless device is predicted to be near the respective access terminal of the one or more access terminals; and
      a notification message to provide the respective at least portion of the requested content to the wireless device via the data connectivity when the wireless device is near the respective access terminal of the one or more access terminals.

17. A non-transitory processor-readable storage medium having stored thereon processor-executable instructions configured to cause a processor to perform operations comprising:
  receiving a destination and a request for content from a wireless device;
  determining a location of one or more access terminals for providing data connectivity between a current location of the wireless device and the received destination;
  selecting one or more routes of travel for the wireless device to the destination based upon the determined location of the one or more access terminals;
  predicting a time period that the wireless device will be near each of the one or more access terminals on the selected one or more routes of travel; and
  sending to each of the one or more access terminals along the one or more selected routes of travel:
    at least a portion of the requested content based upon the predicted time period, wherein the at least portion of the requested content is received in advance of when the wireless device is predicted to be near the respective access terminal of the one or more access terminals; and
    a notification message to provide the respective at least portion of the requested content to the wireless device via the data connectivity when the wireless device is near the respective access terminal of the one or more access terminals.

18. An apparatus, comprising:
  means for receiving a destination and a request for content from a wireless device;
  means for determining a location of one or more access terminals for providing data connectivity between a current location of the wireless device and the received destination;
  means for selecting one or more routes of travel for the wireless device to the destination based upon the determined location of the one or more access terminals;
  means for predicting a time period that the wireless device will be near each of the one or more access terminals on the selected one or more routes of travel; and
  means for sending to each of the one or more access terminals along the one or more selected routes of travel:
    at least a portion of the requested content based upon the predicted time period, wherein the at least portion of the requested content is received in advance of when the wireless device is predicted to be near the respective access terminal of the one or more access terminals; and
    a notification message to provide the respective at least portion of the requested content to the wireless device via the data connectivity when the wireless device is near the respective access terminal of the one or more access terminals.

19. An apparatus for delivering content to a wireless device, comprising:
  a receiving component operable to receive a destination and a request for content from the wireless device;
  a route manger component operable to determine a location of one or more access terminals for providing data connectivity between a current location of the wireless device and the received destination and select one or more routes of travel for the wireless device to the destination based upon the determined location of the one or more access terminals;
  a predicting component a operable to predict a time period that the wireless device will be near each of the one or more access terminals on the selected one or more routes of travel; and
  a content delivery manager component operable to send to each of the one or more access terminals:
    at least a portion of the requested content based upon the predicted time period, wherein the at least portion of the requested content is received in advance of when the wireless device is predicted to be near the respective access terminal of the one or more access terminals; and
    a notification message to provide the respective at least portion of the requested content to the wireless device via the data connectivity when the wireless device is near the respective access terminal of the one or more access terminals.

20. The apparatus of claim 19, wherein the receiving component receives the destination from a navigation system associated with the wireless device.

21. The apparatus of claim 20, wherein the navigation system is one of a vehicle navigation system or a navigation system application on the wireless device.

22. The apparatus of claim 19, wherein the route manger component is further operable to select the one or more routes of travel based upon the request for content received from the wireless device.

23. The apparatus of claim 19, wherein the route manger component is further operable to select the one or more routes of travel by determining a route of travel that maximizes an amount of contact with the one or more access terminals.

24. The apparatus of claim 23, wherein the one or more access terminals are associated with a particular content provider.

25. The apparatus of claim 19, wherein the route manger component is further operable to update the selected one or more routes of travel based upon one or more of traffic information, a current speed of the wireless device, weather information, or navigation information from a navigation system associated with the wireless device.

26. The apparatus of claim 25, wherein the route manger component is further operable to update the selected one or more routes of travel by predicting updates to the selected one or more routes of travel based upon an input received from a sensor indicating a change of direction for the wireless device.

27. The apparatus of claim 26, wherein the input comprises one of a speed of travel or a degree of a turn.

28. The apparatus of claim 19, wherein the predicting component is further operable to predict the time period the wireless device will be near each of the one or more access terminals based upon one or more of traffic information, a current speed of the wireless device, weather information, or navigation information from a navigation system associated with the wireless device.

29. The apparatus of claim 19, wherein the content delivery manager component is further operable to:
  send at least a portion of the requested content to each of the one or more access terminals by sending a first amount of content to a first access terminal and a second amount of content to a second access terminal based upon the predicted time periods; and
  send a notification message to each of the one or more access terminals by:
    notifying the first access terminal of a first amount of time that the wireless device will be near the first access terminal; and
    notifying the second access terminal of a second amount of time that the wireless device will be near the second access terminal.

30. The apparatus of claim 29, wherein the first amount of content and the second amount of content have a portion of content that overlaps.

31. The apparatus of claim 29, the content delivery manager component is further operable to deactivate the first access terminal when the second access terminal starts to provide the second amount of content to the wireless device.

32. The apparatus of claim 19, wherein the content comprises one or more of video, text, music, audio, or voice.

33. The apparatus of claim 19, wherein the route manager component is further operable to determine a direction of travel for the wireless device via a Controller Area Network Bus (CANBUS) system on a vehicle associated with the wireless device.

34. A method for delivering content from a server to a wireless device, comprising:
  receiving, by the server, a direction of travel and a request for content from the wireless device;
  selecting, by the server, a route of travel for the wireless device that proceeds in the received direction to maximize an amount of contact with access terminals capable of providing data connectivity;
  predicting, by the server, a time period the wireless device will be near each of the access terminals on the selected route of travel; and
  providing content to the wireless device via the data connectivity provided by the access terminals, wherein providing the content to the wireless device comprises sending, by the server:
    at least a portion of the requested content to each of the access terminals based upon a corresponding predicted time period, wherein the at least portion of the requested content is received in advance of when the wireless device is predicted to be near the respective access terminals; and
    a notification message to each of the access terminals to provide the respective at least portion of the requested content to the wireless device via the data connectivity when the wireless device is near the respective access terminals.

35. The method of claim 34, wherein the direction of travel is determined via a Controller Area Network Bus (CANBUS) system on a vehicle associated with the wireless device.

36. The method of claim 34, further comprising:
  receiving, by the server, a destination for the wireless device; and
  determining, by the server, locations of the access terminals for providing data connectivity between a current location of the wireless device and the received destination,
  wherein selecting the route of travel is further based upon the determined locations of the access terminals.

37. The method of claim 36, wherein the determined locations for one or more of the access terminals are capable of changing.

38. The method of claim 36, wherein the determined locations for one or more of the access terminals are static.

39. A server, comprising:
  at least one processor configured with processor-executable instructions to perform operations comprising:
    receiving a direction of travel and a request for content from a wireless device;
    selecting a route of travel for the wireless device that proceeds in the received direction to maximize an amount of contact with access terminals capable of providing data connectivity;
    predicting a time period the wireless device will be near each of the access terminals on the selected route of travel; and
    providing content to the wireless device via the data connectivity provided by the access terminals, wherein providing the content to the wireless device comprises sending:
      at least a portion of the requested content to each of the access terminals based upon a corresponding predicted time period, wherein the at least portion of the requested content is received in advance of when the wireless device is predicted to be near the respective access terminals; and
      a notification message to each of the access terminals to provide the respective at least portion of the requested content to the wireless device via the data connectivity when the wireless device is near the respective access terminals.

40. A non-transitory processor-readable medium having stored thereon processor-executable instructions configured to cause a server processor to perform operations comprising:
  receiving a direction of travel and a request for content from a wireless device;

selecting a route of travel for the wireless device that proceeds in the received direction to maximize an amount of contact with access terminals capable of providing data connectivity;
predicting a time period the wireless device will be near each of the access terminals on the selected route of travel; and
providing content to the wireless device via the data connectivity provided by the access terminals, wherein providing the content to the wireless device comprises sending:
   at least a portion of the requested content to each of the access terminals based upon a corresponding predicted time period, wherein the at least portion of the requested content is received in advance of when the wireless device is predicted to be near the respective access terminals; and
   a notification message to each of the access terminals to provide the respective at least portion of the requested content to the wireless device via the data connectivity when the wireless device is near the respective access terminals.

41. An apparatus, comprising:
means for receiving a direction of travel and a request for content from a wireless device;
means for selecting a route of travel for the wireless device that proceeds in the received direction to maximize an amount of contact with access terminals capable of providing data connectivity;
means for predicting a time period that the wireless device will be near each of the access terminals on the selected route of travel; and
means for providing content to the wireless device via the data connectivity provided by the access terminals, wherein means for providing the content to the wireless device comprises means for sending:
   at least a portion of the requested content to each of the access terminals based upon a corresponding predicted time period, wherein the at least portion of the requested content is received in advance of when the wireless device is predicted to be near the respective access terminals; and
   a notification message to each of the access terminals to provide the respective at least portion of the requested content to the wireless device via the data connectivity when the wireless device is near the respective access terminals.

42. An apparatus for delivering content to a wireless device, comprising:
a receiving component operable to receive a direction of travel and a request for content from the wireless device;
a route manager component operable to select a route of travel for the wireless device that proceeds in the received direction to maximize an amount of contact with access terminals capable of providing data connectivity;
a prediction component operable to predict a time period that the wireless device will be near each of the access terminals on the selected route of travel; and
a content delivery manager component operable to provide content to the wireless device via the data connectivity provided by the access terminals, wherein the content delivery manager component is operable to provide content by:
   sending at least a portion of the requested content to each of the access terminals based upon a corresponding predicted time period, wherein the at least portion of the requested content is received in advance of when the wireless device is predicted to be near the respective access terminals; and
   sending a notification message to each of the access terminals to provide the respective at least portion of the requested content to the wireless device via the data connectivity when the wireless device is near the respective access terminals.

43. The apparatus of claim 42, wherein the direction of travel is determined via a Controller Area Network Bus (CANBUS) system on a vehicle associated with the wireless device.

44. The apparatus of claim 42, wherein:
the receiving component is further operable to receive a destination for the wireless device; and
the route manager component is further operable to determine a location of each of the access terminals for providing data connectivity between a current location of the wireless device and the received destination,
wherein the selected route of travel is further based on the determined location of each of the access terminals.

45. The apparatus of claim 44, wherein the determined locations of access terminals are capable of changing.

46. The apparatus of claim 44, wherein the determined locations of the access terminals are static.

47. A method for delivering content to a wireless device, comprising:
receiving, at an access terminal, a request from a server to transmit a portion of content to the wireless device;
receiving, at the access terminal, a notification message from the server, wherein the notification message includes a predicted time period that the wireless device will be near the access terminal;
receiving, at the access terminal, the portion of content from the server in advance of when the wireless device is predicted to be near the access terminal, wherein the portion of content is based on the predicted time period that the wireless device will be near the access terminal; and
transmitting, by the access terminal, the portion of content to the wireless device via a data connectivity provided by the access terminal.

48. The method of claim 47, wherein the predicted time period is based on an estimated arrival time of the wireless device within a communication coverage area of the access terminal.

49. The method of claim 47, further comprising:
determining a parameter for sharing the content; and
applying the parameter for sharing the content to the transmitting of the content.

50. The method of claim 49, wherein the parameter for sharing includes requiring a payment in exchange for the content.

51. The method of claim 49, wherein the parameter for sharing includes specifying a degree of a relationship of a contact in relation to a user of the access terminal.

52. An access terminal, comprising:
at least one processor configured with processor-executable instructions to perform operations comprising:
   a request from a server to transmit a portion of content to the wireless device;
   receiving a notification message from the server, wherein the notification message includes a predicted time period that the wireless device will be near the access terminal;
   receiving the portion of content from the server in advance of when the wireless device is predicted to be near the access terminal, wherein the portion of content is based on the predicted time period that the wireless device will be near the access terminal; and
transmitting the portion of content to the wireless device via a data connectivity provided by the access terminal.

53. A non-transitory processor-readable storage medium having stored thereon processor-executable instructions configured to cause at least one processor of an access terminal to perform operations comprising:
receiving a request from a server to transmit a portion of content to a wireless device;
receiving a notification message from the server, wherein the notification message includes a predicted time period that the wireless device will be near the access terminal;
receiving the portion of content from the server in advance of when the wireless device is predicted to be near the access terminal, wherein the portion of content is based on the predicted time period that the wireless device will be near the access terminal; and
transmitting the portion of content to the wireless device via a data connectivity provided by the access terminal.

54. An access terminal, comprising:
means for receiving a request from a server to transmit a portion of content to a wireless device;
means for receiving a notification message from the server, wherein the notification message includes a predicted time period that the wireless device will be near the access terminal;
means for receiving the portion of content from the server in advance of when the wireless device is predicted to be near the access terminal, wherein the portion of content is based on the predicted time period that the wireless device will be near the access terminal; and
means for transmitting the portion of content to the wireless device via a data connectivity provided by the access terminal.

55. An access terminal for delivering content, comprising:
a content delivery component operable to:
receive a request, from a server, to transmit a portion of content to a wireless device;
receive a notification message from the server, wherein the notification message includes a predicted time period that the wireless device will be near the access terminal;
receive the portion of content from the server in advance of when the wireless device is predicted to be near the access terminal, wherein the portion of content is based on the predicted time period that the wireless device will be near the access terminal; and
transmit the portion of content to the wireless device via a data connectivity provided by the access terminal.

56. The access terminal of claim 55, wherein the predicted time period is based on an estimated arrival time of the wireless device within a communication coverage area of the access terminal.

57. The access terminal of claim 55, further comprising:
a sharing component operable to determine a parameter for sharing the content,
wherein the content delivery component is further operable to apply the parameter for sharing the content to the transmitting of the content.

58. The access terminal of claim 57, wherein the parameter for sharing includes requiring a payment in exchange for the content.

59. The access terminal of claim 57, wherein the parameter for sharing includes specifying a degree of a relationship of a contact in relation to a user of the access terminal.

60. A method for receiving content on a wireless device, comprising:
sending a selected travel destination and a request for content to a server;
receiving, from the server, a determined route of travel to the selected travel destination, wherein the determined route of travel is based upon locations of a plurality of access terminals providing data connectivity between a current location of the wireless device and the selected travel destination;
navigating the determined route of travel to the selected travel destination; and
receiving content via the data connectivity provided by the plurality of access terminals while navigating the determined route of travel, wherein receiving content comprises:
navigating within a vicinity of each of the plurality of access terminals for a period of time; and
receiving, from each access terminal, a corresponding portion of the requested content, wherein the corresponding portion of the requested content is based on the period of time navigated within the vicinity of that access terminal, wherein at least the portion of requested content is provided by the server to that access point in advance of when the wireless device is predicted to start navigating within the vicinity.

61. The method of claim 60, wherein sending the request for content to the server is based on a received content selection.

62. The method of claim 60, wherein the selected travel destination is from a navigation system associated with the wireless device.

63. The method of claim 60, further comprising:
updating the determined route of travel based upon one or more of traffic information, a current speed of the wireless device, weather information, or navigation information from a navigation system associated with the wireless device.

64. The method of claim 60, further comprising:
receiving a notification that the determined route has changed.

65. The method of claim 64, wherein the notification comprises one or more of an alarm or a voice message.

66. A wireless device comprising:
at least one processor configured with processor-executable instructions to perform operations comprising:
sending a selected travel destination and a request for content to a server;
receiving a determined route of travel to the selected destination, wherein the determined route of travel is based upon locations of a plurality of access terminals providing data connectivity between a current location and the selected travel destination;
navigating the determined route of travel to the selected travel destination; and
receiving content via the data connectivity provided by the plurality of access terminals while navigating the determined route of travel, wherein receiving content comprises:
navigating within a vicinity of each of the plurality of access terminals for a period of time; and
receiving, from each access terminal, a corresponding portion of the requested content, wherein the corresponding portion of the requested content is based on the period of time navigated within the vicinity of that access terminal, wherein at least the portion of requested content is provided by the server to that access point in advance of when the wireless device is predicted to start navigating within the vicinity.

67. A non-transitory processor-readable storage medium having stored thereon processor-executable instructions configured to cause a processor of a wireless device to perform operations comprising:
sending a selected travel destination and a request for content to a server;
receiving a determined route of travel to the selected travel destination, wherein the determined route of travel is based upon locations of a plurality of access terminals providing data connectivity between a current location and the selected travel destination;
navigating the determined route of travel to the selected travel destination; and
receiving content via the data connectivity provided by the plurality of access terminals while navigating the determined route of travel, wherein receiving content comprises:
 navigating within a vicinity of each of the plurality of access terminals for a period of time; and
 receiving, from each access terminal, a corresponding portion of the requested content, wherein the corresponding portion of the requested content is based on the period of time navigated within the vicinity of that access terminal, wherein at least the portion of requested content is provided by the server to that access point in advance of when the wireless device is predicted to start navigating within the vicinity.

68. A wireless device, comprising:
means for sending a selected travel destination and a request for content to a server;
means for receiving a determined route of travel to the selected travel destination, wherein the determined route of travel is based upon locations of a plurality of access terminals providing data connectivity between a current location and the selected travel destination;
means for navigating the determined route of travel to the selected travel destination; and
means for receiving content via the data connectivity provided by the plurality of access terminals while navigating the determined route of travel, wherein means for receiving content comprises:
 means for navigating within a vicinity of each of the plurality of access terminals for a period of time; and
 means for receiving, from each access terminal, a corresponding portion of the requested content, wherein the corresponding portion of the requested content is based on the period of time navigated within the vicinity of that access terminal, wherein at least the portion of requested content is provided by the server to that access point in advance of when the wireless device is predicted to start navigating within the vicinity.

69. An apparatus for receiving content, comprising:
a navigation component operable to send a selected travel destination to a server, receive a determined route of travel to the selected travel destination, wherein the determined route of travel is based upon locations a plurality of access terminals providing data connectivity between a current location and the selected travel destination, and navigate the determined route of travel to the selected travel destination; and
a presenting component operable to receive content via the data connectivity provided by the plurality of access terminals while navigating the determined route of travel, wherein receiving content comprises:
 navigating within a vicinity of each of the plurality of access terminals for a period of time; and
 receiving, from each access terminal, a corresponding portion of the content, wherein the corresponding portion of the content is based on the period of time navigated within the vicinity of that access terminal, wherein at least the portion of requested content is provided by the server to that access point in advance of when the wireless device is predicted to start navigating within the vicinity.

70. The apparatus of claim 69, further comprising:
a selection component operable to select content to receive; and
a request component operable to send a request for the content.

71. The apparatus of claim 69, wherein the selected travel destination is from a navigation system associated with the wireless device.

72. The apparatus of claim 69, wherein the navigation component is further operable to update the determined route of travel based upon one or more of traffic information, a current speed of the wireless device, weather information, or navigation information from a navigation system associated with the wireless device.

73. The apparatus of claim 69, wherein the navigation component is further operable to receive a notification that the determined route of travel has changed.

74. The apparatus of claim 73, wherein the notification comprises one or more of an alarm or a voice message.

* * * * *